US012450815B2

(12) United States Patent
Ma

(10) Patent No.: US 12,450,815 B2
(45) Date of Patent: Oct. 21, 2025

(54) IMAGE RENDERING METHOD AND APPARATUS, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Weijin Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 198 days.

(21) Appl. No.: 18/330,458

(22) Filed: Jun. 7, 2023

(65) Prior Publication Data
US 2023/0316626 A1 Oct. 5, 2023

Related U.S. Application Data

(63) Continuation of application No. PCT/CN2022/132727, filed on Nov. 18, 2022.

(30) Foreign Application Priority Data

Feb. 25, 2022 (CN) .......................... 202210176827.2

(51) Int. Cl.
G06T 15/00 (2011.01)
(52) U.S. Cl.
CPC .................................. *G06T 15/005* (2013.01)
(58) Field of Classification Search
None
See application file for complete search history.

(56) References Cited

U.S. PATENT DOCUMENTS 7,274,368 B1 9/2007 Keslin
2010/0020088 A1* 1/2010 Harumoto .............. G09G 5/395
345/545

(Continued)

FOREIGN PATENT DOCUMENTS

CN 109213607 * 1/2019 ............... G06F 9/54
CN 109213607 A 1/2019

(Continued)

OTHER PUBLICATIONS

The World Intellectual Property Organization (WIPO) International Search Report for PCT/CN2022/132727 Feb. 10, 2023 6 Pages (including translation).
The State Intellectual Property Office of the People's Republic of China (SIPO) Office Action 1 for 202210176827.2 Apr. 6, 2022 12 Pages (including translation).

(Continued)

*Primary Examiner* — Andrew G Yang
(74) *Attorney, Agent, or Firm* — ANOVA LAW GROUP, PLLC

(57) ABSTRACT

An image rendering method includes: acquiring N primary render tasks related to a target image, and primary parameter description information that describes execution parameters for executing the N primary render tasks respectively; calling N primary record threads, and parallelly recording the N pieces of primary parameter description information into corresponding primary render command lists to obtain N recorded primary render command lists; and submitting the N recorded primary render command lists to a render platform, the render platform being configured to parallelly execute the N primary render tasks according to the N recorded primary render command lists to obtain the target image.

20 Claims, 8 Drawing Sheets

(56) References Cited

U.S. PATENT DOCUMENTS

| | | | |
|---|---|---|---|
| 2016/0055608 A1* | 2/2016 | Frascati | G06T 15/005 |
| | | | 345/522 |
| 2022/0318943 A1 | 10/2022 | Wang et al. | |
| 2023/0033306 A1 | 2/2023 | Xu | |
| 2023/0195520 A1* | 6/2023 | Neyman | G06F 9/5005 |
| | | | 718/104 |
| 2023/0316626 A1 | 10/2023 | Ma | |

FOREIGN PATENT DOCUMENTS

| | | |
|---|---|---|
| CN | 111400024 A | 7/2020 |
| CN | 112381918 A | 2/2021 |
| CN | 112835712 A | 5/2021 |
| CN | 113112579 A | 7/2021 |
| CN | 113516774 A | 10/2021 |
| CN | 114247138 A | 3/2022 |
| TW | 202143057 A | 11/2021 |

OTHER PUBLICATIONS

KillJump, "DX12 study notes (Longshu) (Point 2: Initial configuration of Draw function—command list and execution)", https://blog.csdn.net/killian0213/article/details/106435184/, May 30, 2020 4 Pages (including translation).

Hailiang Jin et al. "Research on visual simulation system of coal mine roadway based on VR", "China University of Mining and Technology Press", Dec. 31, 2014.

GDC17 Advanced Graphics Tech: "D3D12 and Vulkan Done Right" & "Wave Programming in D3D12 and Vulkan", https://www.gdcvault.com/play/1024732/Advanced-Graphics-Tech-D3D12-and 11 pages.

Vulkan Specification, https://www.khronos.org/registry/vulkan/specs/1.2-extensions/html/index.html, 14 pages.

D3D12 Specification, https://microsoft.github.io/DirectX-Specs/, 4 pages.

Metal Specification, https://developer.apple.com/documentation/metal?language=objc, 6 pages.

BGFX, https://github.com/bkaradzic/bgfx, 47 pages.

* cited by examiner

IMAGE RENDERING METHOD AND APPARATUS, COMPUTER DEVICE, AND COMPUTER-READABLE STORAGE MEDIUM

CROSS-REFERENCES TO RELATED APPLICATIONS

This application is a continuation application of PCT Patent Application No. PCT/CN2022/132727, filed on Nov. 18, 2022, which claim priority to Chinese Patent Application No. 202210176827.2, filed on Feb. 25, 2022, the entire contents of both of which are incorporated herein by reference.

FIELD OF THE TECHNOLOGY

The present disclosure relates to the field of cloud technologies, in particular to an image rendering method and apparatus, a computer device, a computer-readable storage medium and a computer program product.

BACKGROUND

A game engine refers to an editable game system that has been compiled, or a core component of interactive real-time graphical application. The game engine can provide various tools required by a game designer to compile a game. An objective of the game engine is to enable the game designer to develop a game program easily without starting from scratch to compile a game program. The game engine generally contains various functions or modules such as a render engine (namely "renderer", including: a two-dimensional graphics engine and a three-dimensional graphics engine), a physics engine, a collision detection system, etc. At present, the game engine needs to generate a plurality of layers of render command lists to render game images in game scenarios, which increases internal memory and processor overhead.

SUMMARY

Embodiments of the present disclosure provide an image rendering method and apparatus, a computer device, a computer-readable storage medium and a computer program product, which can reduce internal memory and processor overhead.

In an aspect, an embodiment of the present disclosure provides an image rendering method, including: acquiring N primary render tasks related to a target image to be rendered, and N pieces of primary parameter description information that describes execution parameters for executing the N primary render tasks respectively, N being a positive integer; determining primary render command lists for executing the N primary render tasks respectively, the primary render command lists being associated with a render platform for executing the N primary render tasks; calling N primary record threads, and parallelly recording the N pieces of primary parameter description information into the corresponding primary render command lists to obtain N recorded primary render command lists, one primary record thread corresponding to one of the primary render command lists; and submitting the N recorded primary render command lists to the render platform, the render platform being configured to parallelly execute the N primary render tasks according to the N recorded primary render command lists to obtain the target image.

In an aspect, an embodiment of the present disclosure provides an image rendering apparatus, including: an acquiring module, configured to acquire N primary render tasks related to a target image to be rendered, and N pieces of primary parameter description information that describes execution parameters for executing the N primary render tasks respectively, N being a positive integer; a determining module, configured to determine primary render command lists for executing the N primary render tasks respectively, the primary render command lists being associated with a render platform for executing the N primary render tasks; a calling module, configured to call N primary record threads, and parallelly record the N pieces of primary parameter description information into the corresponding primary render command lists to obtain N recorded primary render command lists, one primary record thread corresponding to one of the primary render command lists; and a submitting module, configured to submit the N recorded primary render command lists to the render platform, the render platform being configured to parallelly execute the N primary render tasks according to the N recorded primary render command lists to obtain the target image.

In an aspect, an embodiment of the present disclosure provides a computer device, including: at least one processor and at least one memory, the at least one processor being connected with the at least one memory, the at least one memory being configured to store a computer program, and the at least one processor being configured to call the computer program to enable the computer device to execute the above method.

In an aspect, an embodiment of the present disclosure provides a non-transitory computer-readable storage medium, the non-transitory computer-readable storage medium storing a computer program, the above computer program including a program instruction, and the above program instruction, when executed by a processor, executing the above method.

In the embodiments of the present disclosure, the computer device may acquire the N primary render tasks of the to-be-rendered target image, and the primary parameter description information used for describing the execution parameters required for executing the N primary render tasks respectively; and a render object refers to people, articles, plants and so on, and object attribute information includes materials, colors, position information and other information of the render object. The computer device may determine primary render command lists required for executing the N primary render tasks respectively, and the primary render command lists are associated with the render platform used for executing the N primary render tasks, that is, render commands in the primary render command lists can be executed by the render platform; and the N primary record threads are called, and the N pieces of primary parameter description information are parallelly recorded into the corresponding primary render command lists respectively to obtain the recorded primary render command lists corresponding to the N primary render tasks respectively. The N recorded primary render command lists are submitted to the render platform, and the render platform indicates parallel execution of the N primary render tasks according to the N recorded primary render command lists to obtain the target image.

According to the embodiments of the present disclosure, the primary parameter description information of the primary render tasks are recorded into the primary render command lists related to the render platform to obtain the recorded primary render command lists, that is, the recorded primary render command lists are associated with the render platform, the recorded primary render command lists can be directly executed by the render platform, that is, there is no need to generate a plurality of layers of primary render command lists, there is no need to perform a translation operation on the primary render command lists, and the internal memory and processor overhead is reduced. At the same time, by calling the N primary record threads to parallelly record the primary render command lists, multi-thread recording may be realized, and the recording efficiency of the primary render command lists is improved.

DESCRIPTION OF EMBODIMENTS

Figure 1:
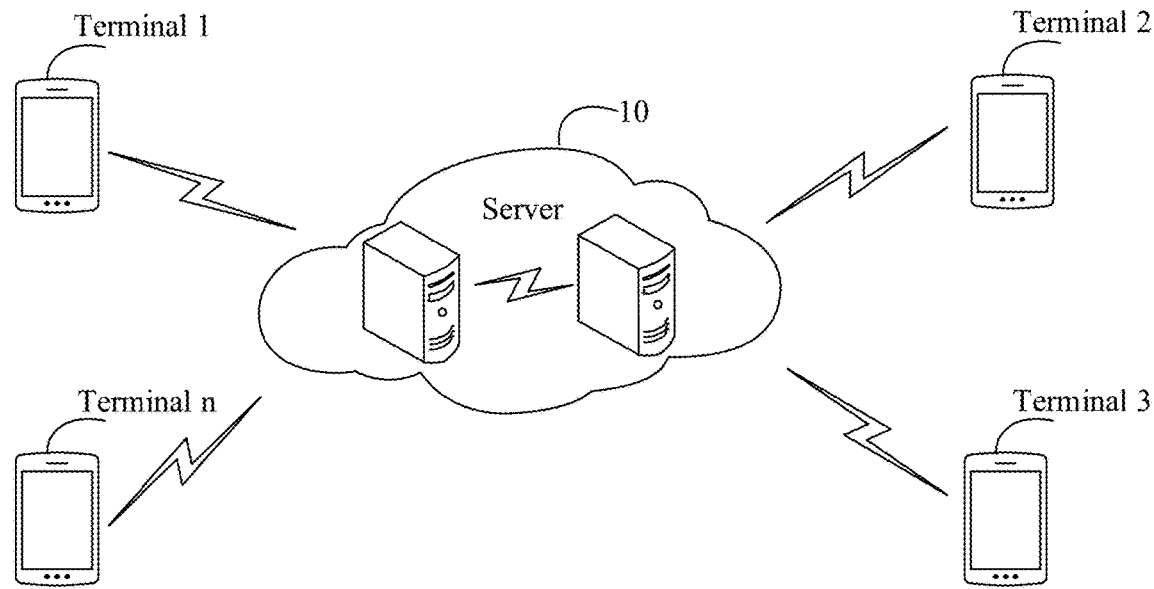
FIG. 1 is a schematic diagram of an architecture of a first image rendering system provided by the present disclosure.

The technical solutions in embodiments of the present disclosure will be clearly and completely described in the following with reference to accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

It needs to be pointed out that in the embodiments of the present disclosure, relevant data, such as user information and user feedback data, is involved, when the embodiments of the present disclosure are applied to a specific product or technology, user permission or consent needs to be obtained, and collection, use and processing of the relevant data need to conform to related laws and regulations and standards in a related country and region.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, a description is made on nouns and terms in the embodiments of the present disclosure, and the nouns and terms involved in the embodiments of the present disclosure are applicable to the following explanations.

1) Rendering: in the field of computers, rendering in computer graphics refers to a process of using software to generate images from a model. The model is a description of a three-dimensional object using a strictly defined language or data structure, which includes geometric, viewpoint, texture, and lighting information. For example: the description of the three-dimensional object or a three-dimensional scenario is converted into a two-dimensional image, and the generated two-dimensional image is used for reflecting the three-dimensional object or the three-dimensional scenario.

2) Virtual scenario: a scenario outputted by a device and different from the real world, visual perception of the virtual scenario can be formed through naked eyes or device assistance, such as two-dimensional images outputted by a display screen, and three-dimensional images outputted by stereoscopic display technologies such as stereo projection, virtual reality and augmented reality technologies. In addition, various real-world simulating perceptions such as auditory perception, tactile perception, olfactory perception, and motion perception may further be formed through various possible hardware. The virtual scenario may be a game virtual scenario. In this embodiment of the present disclosure, the virtual scenario is called a scenario for short.

The present disclosure may be applied to an image rendering scenario, and the image rendering scenario may refer to a game application scenario, a live broadcast scenario, an audio and video play scenario and the like. The game scenario may include a cloud gaming scenario, and cloud gaming may also be called gaming on demand, which is an online game technology based on a cloud computing technology. The cloud gaming technology enables a thin client with relatively limited graphics processing and data computing capabilities to run high-quality games. In the cloud gaming scenario, games do not run on a player game terminal, but in a cloud server, and the cloud server renders a game scenario into an audio and video stream and transmits it to the player game terminal through a network. The player game terminal does not need to have strong graphics computing and data processing capabilities, and only needs to have basic streaming media play capabilities and the ability to acquire player input instructions and send them to the cloud server. A target image in this embodiment of the present disclosure is any video frame in the audio and video stream.

The present disclosure mainly takes a game application scenario as an example to explain an image rendering method in this embodiment of the present disclosure. At present, in a process of rendering game images in the game scenario, a game engine needs to generate a plurality of layers of render command lists to render the game images in the game scenario, which increases internal memory and processor overhead. For example, the game engine needs to generate two layers of render command lists, the first layer of render command list is related to a render platform, the second layer of render command list is independent of the render platform, the first layer of render command list is used for translating the second layer of render command list into a render command list related to the render platform to obtain a translated render command list, and the translated render command list is used for rendering the game images in the game scenario, which increases the internal memory and processor overhead. Based on this problem, the present disclosure provides an image rendering method, including: when a certain frame of image in a game application scenario needs to be rendered, the image frame may be called a target image, a computer device may determine N primary render tasks of the to-be-rendered target image, and primary parameter description information used for describing execution parameters required for executing the N primary render tasks respectively according to object attribute information of a render object, where the render object refers to people, articles, plants and so on, and the object attribute information includes materials, colors, position information and other information of the render object; and the primary parameter description information may include resource types, task attribute information, resource state change information and other information of render resources required for executing the N primary render tasks, the task attribute information includes position information, materials, sizes and the like of a render task (namely the render object), the render resources include texture resources, pixel resources, depth resources, mapping resources, stencil resources and the like, and the resource state change information includes information for changing a resource state of the render resources.

In some embodiments, the computer device may determine primary render command lists required for executing the N primary render tasks respectively, and the primary render command lists are associated with a render platform used for executing the N primary render tasks, that is, render commands in the primary render command lists can be executed by the render platform; the render platform may refer to a platform for executing recorded primary render command lists, N primary record threads are called, and N pieces of primary parameter description information are parallelly recorded into the corresponding primary render command lists respectively to obtain the recorded primary render command lists corresponding to the N primary render tasks respectively; and one record thread corresponds to one primary render command list. In some embodiments, the N recorded primary render command lists are submitted to the render platform, and the render platform indicates parallel execution of the N primary render tasks according to the N recorded primary render command lists to obtain the target image. That is, the primary parameter description information of the primary render tasks is recorded into the primary render command lists related to the render platform to obtain the recorded primary render command lists, that is, the recorded primary render command lists are associated with the render platform, the recorded primary render command lists can be directly executed by the render platform, that is, there is no need to generate a plurality of layers of primary render command lists, there is no need to perform a translation operation on the primary render command lists, and the internal memory and processor overhead is reduced. At the same time, by calling the N primary record threads to parallelly record the primary render command lists, multi-thread recording may be realized, and the recording efficiency of the primary render command lists is improved.

In order to facilitate clearer understanding of this embodiment of the present disclosure, firstly an image rendering system implementing the image rendering method of this embodiment of the present disclosure is introduced, as shown in FIG. 1, and FIG. 1 is a schematic diagram of an architecture of a first image rendering system provided by the present disclosure. The image rendering system includes, as shown in FIG. 1, a server 10 and a terminal cluster, the terminal cluster may include one or more terminals, and the number of the terminals will not be limited here. As shown in FIG. 1, the terminal cluster may specifically include a terminal 1, a terminal 2, . . . , and a terminal n; and it may be understood that the terminal 1, the terminal 2, the terminal 3, . . . , and the terminal n may all be in network connection with the server 10, so as to facilitate data interaction between each terminal and the server 10 through the network connection.

The server 10 may refer to a device used for providing backend services for applications, for example, the server may refer to a backend device that runs or maintains the applications. Specifically, the server 10 may be used for recording the render command lists and executing the recorded render command lists, to implement the device for rendering images. The terminals may refer to devices facing users, the terminals may refer to devices for providing front-end services for the applications, and the terminals may be used for displaying the target image obtained by rendering. Here the applications may refer to applications for image processing, such as game applications, video play applications and live broadcast applications.

The server may be an independent physical service, or may be a server cluster or distributed system composed of at least two physical servers, or may be a cloud server that provides cloud services, a cloud database, cloud computing, cloud functions, cloud storage, network services, cloud communication, middleware services, domain name services, security services, a content delivery network (CDN), a big data and artificial intelligence platform and other basic cloud computing services. The terminal may specifically refer to a vehicle-mounted terminal, a smart phone, a tablet computer, a notebook computer, a desktop computer, a smart speaker, a screen speaker, a smart watch and the like, but is not limited thereto. The various terminals and the server may be connected directly or indirectly in a wired or wireless communication mode, and at the same time, the number of the terminals and the server may be one or at least two, which is not limited in the present disclosure here.

This embodiment of the present disclosure may be implemented through artificial intelligence (AI), and the AI is a theory, a method, a technology, and an application system that use a digital computer or a machine controlled by the digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

Figure 2:
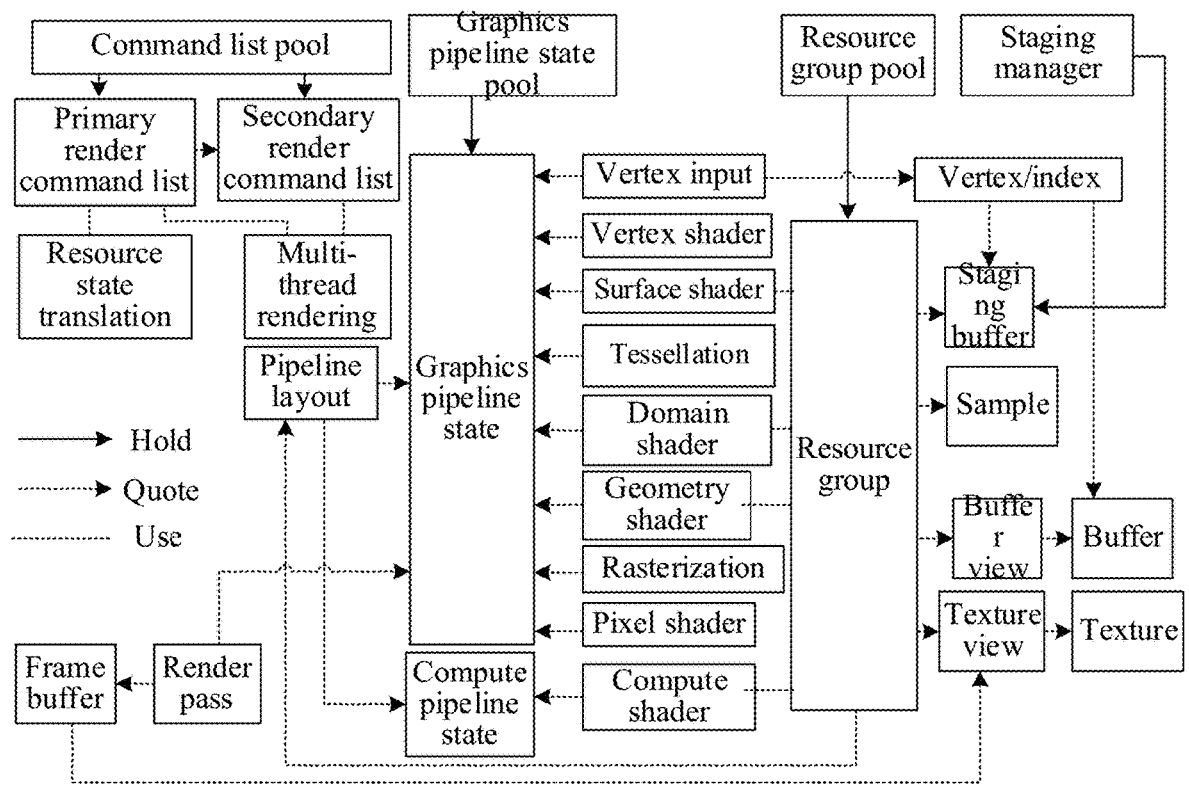
FIG. 2 is a schematic diagram of an architecture of a second image rendering system provided by the present disclosure.

FIG. 2 is a schematic structural diagram of another image rendering system, as shown in FIG. 2, the image rendering system includes a plurality of graphics processing unit (GPU) object managers, such as a graphics pipeline state pool, a command list pool, a resource group pool and a staging manager, in the image rendering system, GPU resources are allocated from various object managers, life cycles are maintained by the object managers, and lift cycles of the GPU resources created by users are maintained by the users.

The graphics pipeline state pool is used for allocating a graphics pipeline state associated with the to-be-rendered target image, where the graphics pipeline state and a compute pipeline state belong to a GPU pipeline state, and the graphics pipeline state contains all states required by a graphics pipeline (e.g., for image rendering) and a compute pipeline. A GPU pipeline refers to a series of fixed stages through which data input flows; and Each stage processes the incoming data and passes it to the next stage. A final product may be a 2D raster plotting image (the graphics pipeline) or a resource (a buffer area or image) updated by using a computational logic and a computing operation (the compute pipeline). The GPU pipeline includes the graphics pipeline, the compute pipeline and the like, and the graphics pipeline commands the buffer area to receive a plurality of render commands (such as the primary render command lists) and draw a 2D rasterization image of a 2D/3D scenario. The compute pipeline performs related computing works by commanding the render commands related to the to-be-rendered target image of the buffer area and processing them.

Pipeline layout is used for describing resources bonded with the GPU pipeline, which contain all resources used by the GPU pipeline.

The GPU resources include texture, buffer and staging buffer, the staging buffer inherits from the buffer and has all functions of the buffer, it is used for temporarily storing temporary data, and may be used as constant buffer, structured buffer for temporarily storing data uploaded to and read back from the GPU.

Views of the GPU resources include a texture view and a buffer view, and each view describes how to use all or a certain part of the resources. GPU resource set: a resource group, used for reducing calling of bonding resources.

Description of a GPU rendering process: a render pass, a set bonded and outputted in the GPU rendering process: frame buffer. GPU command buffer: primary render command lists and secondary render command lists (e.g., also called bundle command list), which are obtained by allocating from the command list pool.

Based on the above image rendering system in FIG. 2, the image rendering process may include the following three stages: an application stage, a geometric stage, and a rasterization stage.

The application stage executes the following processing:
A, scenario data (namely task attribute information) of a primary render task is acquired, such as a position of a camera, material, texture, cone of vision, a model (render object) in the scenario and a used light source.
B, in order to improve rendering performance, it is usually necessary to perform a coarse-grained culling work to remove objects that are not visible in the scenario, so that these objects do not need to be handed over to the geometric stage for processing.
C, render resources and resource state change information required by all primary render tasks are set, and the render resources include, but not limited to the used material, texture, shader and the like; as shown in FIG. 2, the shader includes a vertex shader, a hull shader, a domain shader, a geometry shader, a pixel shader, a compute shader and the like; the vertex shader: a main function is that the render object performs coordinate transformation, and local coordinates inputted into the render object are transformed into world coordinates, observation coordinates and crop coordinates. The hull shader and the domain shader are used for the render object to perform tessellation (e.g., triangular facet subdivision processing), so that objects closer to the camera have richer details, and objects farther away from the camera have fewer details. The input of the geometry shader may be a complete primitive (such as a point), the output may be one or more other primitives (such as a triangular facet), or no primitive is outputted. The pixel shader is used for determining final colors of pixels on a screen. In this stage, lighting calculation and shadow processing may be performed; and the compute shader is used for calculating the pixels and determining which pixels need to be displayed on the screen. The scenario data, the render resources and the resource state change information may be called primary parameter description information.
D, the primary render command lists required for executing all primary render tasks are acquired, the primary render command lists include a plurality of render commands (namely draw commands), the primary parameter description information corresponding to each primary render task is recorded into the corresponding primary render command list, that is, the primary parameter description information is transferred to the render commands in the primary render command lists, to obtain recorded primary render command lists.

The geometric stage is used for processing all works related to to-be-rendered geometry. For example: it determines what primitive to draw, how to draw it and where to draw it. vertex coordinate transformation, lighting, cropping, projection and screen mapping of the primary render tasks based on the recorded primary render command lists are executed, this stage performs operation based on the GPU, and vertex coordinates, colors and texture coordinates after transformation and projection are obtained at a tail of this stage. In short, the main work of the geometric stage is "transformation of three-dimensional vertex coordinates" and "lighting calculation".

The rasterization stage: it mainly determines which pixels in each render primitive are to be drawn on the screen. The recorded primary render command lists are executed, vertex-by-vertex data obtained from the previous stage is interpolated, and then pixel-by-pixel processing is performed. That is, rasterization is actually a process of transforming geometric primitives into two-dimensional target images, and the process mainly contains two parts of work: rasterization and fragment shading. Rasterization: it determines which integer grid areas in window coordinates are occupied by basic primitives, this part mainly corresponds to two stages: triangle setting and triangle traversing, which are completed through interpolation calculation, this stage outputs a fragment sequence, and then a fragment shader may process the fragment sequence. Fragment shading: a color value and a depth value are allocated to each area respectively.

Exemplarily, each point on the two-dimensional target images contains color, depth and texture data, and each point and related information are called a fragment; the fragments are equivalent to the pixels, but the fragments contain other information compared to the pixels, such as positions, normals, colors and texture coordinates; vertexes are fundamental elements that form geometric shapes; the primitives are composed of geometric vertexes, including: points, line segments and polygons; and triangles are used as basic primitives in 3D scenarios.

The three stages in the image rendering process may be executed by the server, the server renders and obtains a target image, and sends the target image to a terminal, and the terminal displays the target image. Or, the three stages in the above image rendering process may also be executed by the terminal, the terminal renders and obtains the target image, and displays the target image in the terminal. Or, the three stages in the image rendering process may be executed by the server and the terminal jointly, the server sends information obtained by rendering to the terminal, the terminal determines the target image according to information obtained by rendering itself and the received information, and displays the target image.

Figure 3:
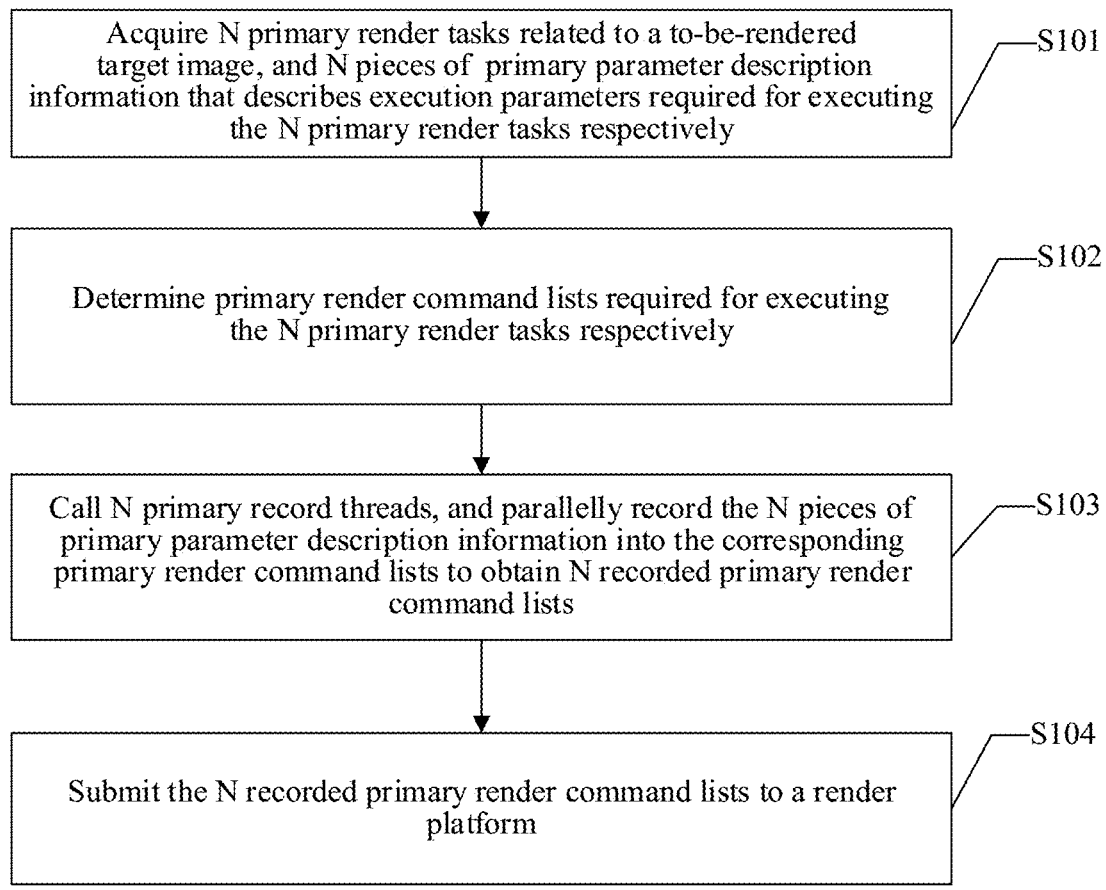
FIG. 3 is a schematic flowchart of a first image rendering method provided by the present disclosure.

In some embodiments, referring to FIG. 3, it is a schematic flowchart of an image rendering method provided by an embodiment of the present disclosure. As shown in FIG. 3, the method may be executed by the terminal in FIG. 1, may also be executed by the server in FIG. 1, and may also be executed by the terminal and the server in FIG. 1 jointly, and the devices for executing the method in this embodiment of the present disclosure may be collectively referred to as a computer device. The image rendering method may include the following steps S101 to S104:

S101: Acquire N primary render tasks related to a target image to be rendered, and N pieces of primary parameter description information that respectively describes execution parameters for executing the N primary render tasks.

Here, N is a positive integer.

The computer device may determine the N primary render tasks of the to-be-rendered target image according to object attribute information of a render object, the render object refers to people, articles, plants and so on, and the object attribute information includes sizes, materials, colors, position information and other information of the render object. For example, the render objects with the same colors may be used as the same primary render task, or the render objects with the same materials may be used as the same render task, or the render objects belonging to the same object type may be used as the same render task, or the render objects with an adjacent positional relationship may be used as the same render task. In some embodiments, shader source codes corresponding to the N primary render tasks respectively may be acquired, and the shader source codes are codes required for executing the primary render tasks; and precompile processing is performed on the shader source codes corresponding to the N primary render tasks respectively to obtain the primary parameter description information used for describing the execution parameters required for executing the N primary render tasks respectively. the primary parameter description information may include resource types, task attribute information, resource state change information and other information of render resources required for executing the N primary render tasks, the task attribute information includes position information, materials, sizes and the like of a render task (namely the render object), the render resources include texture resources, pixel resources, depth resources, mapping resources, stencil resources and the like, and the resource state change information includes information for changing a resource state of the render resources.

S102: Determine primary render command lists required for executing the N primary render tasks respectively.

Here, the primary render command lists are associated with a render platform for executing the N primary render tasks.

The computer device may determine the primary render command lists required for executing the N primary render tasks respectively; and the primary render command lists are associated with the render platform for executing the N primary render tasks, the primary render command lists include a plurality of render commands, and one or more image application interfaces, for example, the image application interface may include a resource state management interface (e.g., staging manager), a begin render pass interface, an end render pass interface, a sub-render pass interface and the like, the resource state management interface is used for managing the resource state of the render resources, the begin render pass interface is used for importing external resources required for executing the primary render tasks, and is an initial producer of the external resources, if a render pass has no other dependencies, it depends on the begin render pass interface, and the end render pass interface is used for exporting the external resources, and is a final consumer of the external resources. The sub-render pass interface is used for importing resources required by the sub-render pass, the render pass is a set of executing render sub-processes of a group of graphics processing units GPU, and the sub-render pass is a sub-render process in a render pass, which usually represents rendering of a class of objects in a game scenario.

S103: Call N primary record threads, and parallelly record the N pieces of primary parameter description information into the corresponding primary render command lists to obtain N recorded primary render command lists.

Exemplarily, one record thread corresponds to one primary render command list, that is, the record threads are in one-to-one correspondence with the primary render command lists.

The computer device may call the N primary record threads corresponding to the N primary render tasks respectively, and parallelly record the N pieces of primary parameter description information into the corresponding primary render command lists to obtain the N recorded primary render command lists; and by calling the N primary record threads to parallelly record the primary render command lists, multi-thread recording may be realized, and the recording efficiency of the primary render command lists is improved.

S104: Submit the N recorded primary render command lists to the render platform.

Exemplarily, the render platform is used for parallelly executing the N primary render tasks according to the N recorded primary render command lists to obtain the target image.

The computer device may submit the N recorded primary render command lists to a render command list of the render platform, and the render platform parallelly executes the N recorded primary render command lists in the render command list, so as to parallelly execute the N primary render tasks to obtain the target image; and the N recorded primary render command lists are obtained by recording, which is conducive to realizing multi-thread rendering of the render platform, and improves the image rendering efficiency.

The platform for recording the primary render command lists and the render platform for executing the recorded primary render command lists belong to the same platform, or the platform for recording the primary render command lists and the render platform for executing the recorded primary render command lists belong to different platforms, which may realize cross-platform image rendering, and improve the convenience of image rendering.

In this embodiment of the present disclosure, the computer device may acquire the N primary render tasks of the to-be-rendered target image, and the primary parameter description information used for describing the execution parameters required for executing the N primary render tasks respectively; and a render object refers to people, articles, plants and so on, and the object attribute information includes materials, colors, position information and other information of the render object. In some embodiments, the computer device may determine primary render command lists required for executing the N primary render tasks respectively, and the primary render command lists are associated with the render platform used for executing the N primary render tasks, that is, render commands in the primary render command lists can be executed by the render platform; the N primary record threads are called, and the N pieces of primary parameter description information are parallelly recorded into the corresponding primary render command lists respectively to obtain the recorded primary render command lists corresponding to the N primary render tasks respectively. In some embodiments, the N recorded primary render command lists are submitted to the render platform, and the render platform indicates parallel execution of the N primary render tasks according to the N recorded primary render command lists to obtain the target image. That is, the primary parameter description information of the primary render tasks are recorded into the primary render command lists related to the render platform to obtain the recorded primary render command lists, that is, the recorded primary render command lists are associated with the render platform, the recorded primary render command lists can be directly executed by the render platform, that is, there is no need to generate a plurality of layers of primary render command lists, there is no need to perform a translation operation on the primary render command lists, and the internal memory and processor overhead is reduced. At the same time, by calling the N primary record threads to parallelly record the primary render command lists, multi-thread recording may be realized, and the recording efficiency of the primary render command lists is improved.

Figure 6:
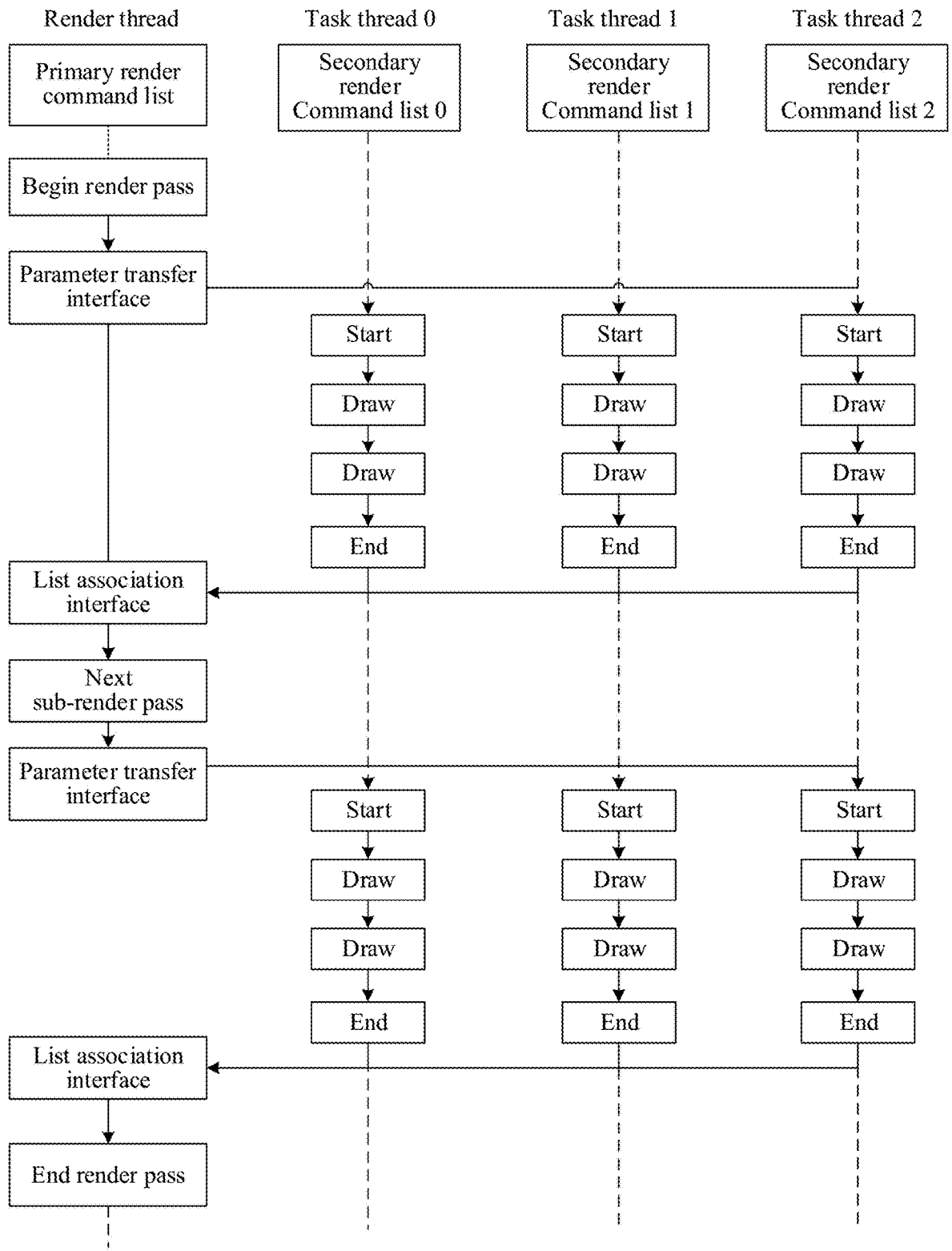
FIG. 6 is a schematic diagram of a scenario where a recorded target primary render command list is executed provided by the present disclosure.

In some embodiments, referring to FIG. 6, FIG. 6 is a schematic diagram of a scenario where a recorded target primary render command list is executed provided by the present disclosure. As shown in FIG. 6, the method may be executed by the terminal in FIG. 1, may also be executed by the server in FIG. 1, and may also be executed by the terminal and the server in FIG. 1 jointly, and the devices for executing the method in this embodiment of the present disclosure may be collectively referred to as a computer device. The image rendering method may include the following steps S201 to S207:

S201: Acquire N primary render tasks related to a to-be-rendered target image, and N pieces of primary parameter description information that respectively describes execution parameters required for executing the N primary render tasks.

Exemplarily, N is a positive integer. The principle of step S201 is the same as that of step S101, and execution of step S201 may refer to above step S101.

S202: Determine primary render command lists required for executing the N primary render tasks respectively.

Exemplarily, the primary render command lists are associated with a render platform for executing the N primary render tasks. The principle of step S202 is the same as that of step S102, and execution of step S202 may refer to above step S102.

S203: Acquire task attribute information of a target primary render task.

Exemplarily, the target primary render task belongs to the N primary render tasks.

In this embodiment of the present disclosure, the computer device may acquire the task attribute information of the target primary render task, the target task attribute information includes object attribute information corresponding to a render object of the target primary render task, and the object attribute information includes color information, material information, size information, position information and the like. The target primary render task may refer to any primary render task in the N primary render tasks.

S204: Determine a record mode of target primary parameter description information corresponding to the target primary render task according to the task attribute information.

In this embodiment of the present disclosure, the computer device may determine execution information related to the target primary render task according to the task attribute information, the execution information includes an execution duration, the number of required render commands, a complexity and the like, and the record mode of the target primary parameter description information corresponding to the target primary render task is determined according to the execution information.

In some embodiments, step S204 may be implemented through the following modes: determining command number of the render commands required for executing the target primary render task according to the task attribute information, and determining, in response to that the command number is greater than a number threshold value, that the record mode of the target primary parameter description information is a parallel record mode; and determining, in response to that the command number is smaller than or equal to the number threshold value, that the record mode of the target primary parameter description information is a serial record mode.

The computer device may determine the command number of the render commands required for executing the target primary render task according to the task attribute information, determine, in response to that the command number is greater than the number threshold value, that the record mode of the target primary parameter description information is the parallel record mode, and execute step S205; and by parallelly recording the target primary parameter description information, the recording efficiency may be improved. In response to that the command number is smaller than or equal to the number threshold value, it is determined that the record mode of the target primary parameter description information is the serial record mode, and step S206 is executed, that is, one primary record thread is adopted to record the target primary parameter description information, the number of the called primary record threads is reduced, and resources may be saved.

In some embodiments, step S204 may be implemented through the following modes: the computer device may determine the execution duration of the target primary render task according to the task attribute information, determine, in response to that the execution duration is greater than a duration threshold value, that the record mode of the target primary parameter description information is the parallel record mode, and execute step S205; and by parallelly recording the target primary parameter description information, a recording duration is shortened, and the recording efficiency may be improved. In response to that the execution duration is smaller than or equal to the duration threshold value, it is determined that the record mode of the target primary parameter description information is the serial record mode, and step S206 is executed, that is, one primary record thread is adopted to record the target primary parameter description information, the number of calling the primary record threads is reduced, and resources may be saved.

In this embodiment of the present disclosure, the execution information of the target primary render task is determined based on the task attribute information, the record mode applicable to the target primary render task is determined based on the execution information of the target primary render task, the flexibility for recording the target primary parameter description information is improved, and the processing efficiency of image rendering is improved.

S205: Parallelly record, in response to that the record mode of the target primary parameter description information is the parallel record mode, the target primary parameter description information into the primary render command list corresponding to the target primary render task according to a target primary record thread to obtain a recorded target primary render command list corresponding to the target primary render task, the target primary record thread being a primary record thread for recording the primary render command list corresponding to the target primary render task in the N primary record threads.

In this embodiment of the present disclosure, in response to that the record mode of the target primary parameter description information is the parallel record mode, the target primary parameter description information is parallelly recorded into the primary render command list corresponding to the target primary render task according to the target primary record thread to obtain the recorded target primary render command list corresponding to the target primary render task; and the primary render command list is recorded through the parallel record mode, so that the recording efficiency may be improved.

In some embodiments, above step S205 may be implemented through the following modes: acquiring, in response to that the record mode of the target primary parameter description information is the parallel record mode, M sub-render tasks obtained by dividing the target primary render task and secondary render command lists required for executing the M sub-render tasks respectively, the secondary render command lists having an inheritance relationship with the primary render command list corresponding to the target primary render task; determining secondary parameter description information required for executing the M sub-render tasks from the target primary parameter description information; and parallelly recording the secondary parameter description information corresponding to the M sub-render tasks into the primary render command list corresponding to the target primary render task according to the target primary record thread and the secondary render command lists corresponding to the M sub-render tasks, to obtain the recorded target primary render command list corresponding to the target primary render task.

In some embodiments, in response to that the record mode of the target primary parameter description information is the parallel record mode, the computer device may determine the M sub-render tasks obtained by dividing the target primary render task according to the render object in the target primary render task, for example, one render object corresponds to one sub-render task, or the same type of render objects corresponds to one sub-render task, or the M sub-render tasks obtained by dividing the target primary render task may be determined according to an area size of the target primary render task, that is, a render area corresponding to the target primary render task is divided according to the area size to obtain M sub-render areas, one sub-render area corresponds to one sub-render task, and the sizes of the M sub-render areas may be the same or different.

In some embodiments, the computer device may acquire the secondary render command lists required for executing the M sub-render tasks respectively, the secondary render command lists and the primary render command list corresponding to the target primary render task have the inheritance relationship therebetween, the secondary render command lists may include one or more render commands, and the one or more render commands are used for implementing the sub-render tasks. The secondary parameter description information required for executing the M sub-render tasks is determined from the target primary parameter description information, and the secondary parameter description information corresponding to the M sub-render tasks is parallelly recorded into the primary render command list corresponding to the target primary render task according to the target primary record thread and the secondary render command lists corresponding to the M sub-render tasks to obtain the recorded target primary render command list corresponding to the target primary render task. The target primary render command list is recorded through the parallel record mode, so that the recording efficiency may be improved.

In some embodiments, the secondary parameter description information corresponding to the M sub-render tasks includes sub-task attribute information corresponding to the M sub-render tasks respectively, and the parallelly recording the secondary parameter description information corresponding to the M sub-render tasks into the primary render command list corresponding to the target primary render task according to the target primary record thread and the secondary render command lists corresponding to the M sub-render tasks, to obtain the recorded target primary render command list corresponding to the target primary render task, includes: acquiring M secondary record threads associated with the target primary record thread, calling the M secondary record threads, and parallelly recording the sub-task attribute information corresponding to the M sub-render tasks into the corresponding secondary render command lists respectively to obtain recorded secondary render command lists corresponding to the M sub-render tasks respectively, where one secondary record thread corresponds to one secondary render command list; and associating (e.g., joining) the M recorded secondary render command lists with the primary render command list corresponding to the target primary render task to obtain the recorded target primary render command list corresponding to the target primary render task.

The computer device may acquire the M secondary record threads associated with the target primary record thread, and the M secondary record threads are threads with the same or similar functions as the target primary record thread; the M secondary record threads are called, and the sub-task attribute information corresponding to the M sub-render tasks is parallelly recorded into the corresponding secondary render command lists respectively to obtain the recorded secondary render command lists corresponding to the M sub-render tasks respectively; one secondary record thread corresponds to one secondary render command list; through the multi-thread record mode, the sub-task attribute information corresponding to the M sub-render tasks may improve the recording efficiency; and the M recorded secondary render command lists are associated with the primary render command list corresponding to the target primary render task to obtain the recorded target primary render command list corresponding to the target primary render task, that is, the M recorded secondary render command lists are submitted to the primary render command list, and uniform execution is realized through the primary render command list, which may adapt to various render platforms. For example, it may adapt to a scenario that supports multi-thread recording of the render command lists, and a scenario that does not support the multi-thread recording of the render command lists.

In some embodiments, the associating the M recorded secondary render command lists with the primary render command list corresponding to the target primary render task to obtain the recorded target primary render command list corresponding to the target primary render task may be implemented through the following modes: acquiring a parameter transfer interface (e.g., fork bundle command lists) of the primary render command list corresponding to the target primary render task and a list association interface (e.g., join bundle command lists), transmitting the M recorded secondary render command lists into the parameter transfer interface, and associating the list association interface with the M recorded secondary render command lists to obtain the recorded target primary render command list corresponding to the target primary render task.

In some embodiments, the computer device may acquire the parameter transfer interface of the primary render command list corresponding to the target primary render task and the list association interface, the parameter transfer interface is an interface for importing the recorded secondary render command lists, the list association interface is used for importing empty parameters, which may be used for being associated with the M recorded secondary render command lists, and when the list association interface is called, the M recorded secondary render command lists may be acquired from the parameter transfer interface.

In some embodiments, the computer device may transfer the M recorded secondary render command lists as array parameters into the parameter transfer interface, and associate the list association interface with the M recorded secondary render command lists to obtain the recorded target primary render command list corresponding to the target primary render task. Through general image application interfaces (the parameter transfer interface and the list association interface), association (namely bonding) between the recorded secondary render command lists and the primary render command list corresponding to the target primary render task is realized, render commands in the recorded secondary render command lists are uniformly executed through the primary render command list, and adaption to various render platforms may be realized, that is, a cross-platform image application interface is provided. In other words, there is no need to consider differences among the render platforms, the parameter transfer interface and the list association interface are a set of general native multi-thread render interfaces, that is, there is no need to design different render interfaces for different render platforms, and applicability and expandability of the native multi-thread render interfaces are improved.

Figure 5:
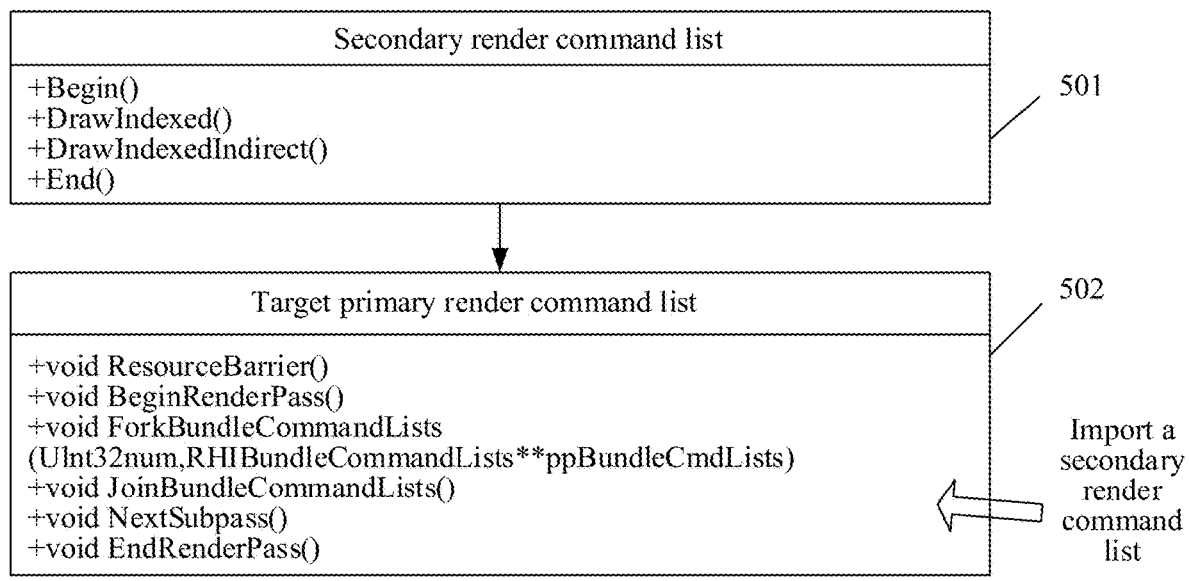
FIG. 5 is a schematic diagram of a target primary render command list and a secondary render command list provided by the present disclosure.

For example, as shown in FIG. 5, FIG. 5 is a schematic diagram of a target primary render command list and a secondary render command list provided by the present disclosure. FIG. 5 represents the import of the secondary render command list to the target primary render command list, the secondary render command list 501 is an example of the secondary render command list, and the target primary render command list 502 is a recorded target primary render command list.

The target primary render command list 502 includes a parameter transfer interface (fork bundle command lists) and a list association interface (join bundle command lists, such as an NGI bundle command list), the secondary render command list 501 includes a plurality of render commands, including a direct draw command DrawIndexed( ) and an indirect draw command DrawIndexedIndirect( ), the computer device may record the secondary render command list as a parameter into the parameter transfer interface in the primary render command list, the parameters in the list association interface in the target primary render command list are empty, and the recorded target primary render command list is obtained. As shown in FIG. 5, the parameter transfer interface of the recorded target primary render command list include: the number of the secondary render command lists (UInt32 num), a list identifier and the like. The list identifier may refer to a list name (such as RHI bundle command list**, and pp bundle command list), a serial number and the like. The secondary render command lists and the target primary render list having the inheritance relationship therebetween refers to that the secondary render command lists have part of functions of the target primary render command list, and the secondary render command lists may be parallelly recorded by multi-threads, and merged and executed by the target primary render command list.

For example, continuing to refer to FIG. 6, it is assumed that the target primary render task includes 3 sub-render tasks, and the secondary render command lists corresponding to the 3 sub-render tasks respectively are a secondary render command list 0, a secondary render command list 1 and a secondary render command list 2; and after the secondary render command list 0, the secondary render command list 1 and the secondary render command list 2 are all recorded into the target primary render command list, render threads may be called to execute a begin render pass interface in the recorded target primary render command list to enter a render pass. A task thread 0, a task thread 1 and a task thread 2 are called, and the secondary render command list 0 (the recorded secondary render command list), the secondary render command list 1 and the secondary render command list 2 in the parameter transfer interface of the recorded target primary render command list are parallelly executed to obtain an execution result 0, an execution result 1 and an execution result 2. The list association interface is called to transfer the execution result 0, the execution result 1 and the execution result 2 to a render sub-pass, these execution results may be used as input of the render sub-pass, the task thread 0, the task thread 1 and the task thread 2 are called, and the secondary render command list 0 (the recorded secondary render command list), the secondary render command list 1 and the secondary render command list 2 in the parameter transfer interface of the recorded target primary render command list are parallelly executed again until render commands of the secondary render command list 0 (the recorded secondary render command list), the secondary render command list 1 and the secondary render command list 2 are executed. When execution is completed, the list association interface of the recorded target primary render command list is called to merge the execution results, and the end render pass interface is called to end a render operation.

In some embodiments, through the parameter transfer interface in the recorded target primary render command list and the list association interface, it may adapt to a first render platform, and the first render platform is a render platform that adopts an image command list interface to execute the render tasks; and the parameter transfer interface in the recorded target primary render command list is configured to execute an empty implementation operation, the list association interface in the recorded target primary render command list is configured to call the image command list interface in the first render platform to execute the M sub-render tasks according to the M recorded secondary render command lists in the recorded target primary render command list. Through the parameter transfer interface in the recorded target primary render command list and the list association interface, it adapts to a second render platform, that is, the set of native multi-render interfaces may be used for the first render platform, multi-thread rendering is realized, and the rendering efficiency is improved.

For example, the first render platform is D3D12, the parameter transfer interface in the recorded target primary render command list and the list association interface are the parameter transfer interface (fork bundle command lists) and the list association interface (join bundle command lists), and the image command list interface of the first render platform may be D3D12GraphicsCommandList. The parameter transfer interface is configured to execute an empty implementation operation, and the empty implementation operation refers to an operation that is meaningless to the render tasks. The list association interface is configured to call D3D12GraphicsCommandList: ExecuteBundle at an underlayer of the first render platform, that is, the list association interface in the recorded target primary render command list is configured to call the image command list interface in the first render platform to execute the M sub-render tasks according to the M recorded secondary render command lists in the recorded target primary render command list.

In some embodiments, through the parameter transfer interface in the recorded target primary render command list and the list association interface, it may adapt to a second render platform, and the second render platform is a render platform that adopts a command executing interface to execute the render tasks. The parameter transfer interface in the recorded target primary render command list is configured to execute the empty implementation operation, and the list association interface in the recorded target primary render command list is configured to call the command executing interface in the second render platform to execute the M sub-render tasks according to the M recorded secondary render command lists in the recorded target primary render command list. Through the parameter transfer interface in the recorded target primary render command list and the list association interface, it adapts to a second render platform, that is, the set of native multi-render interfaces may be used for the second render platform, multi-thread rendering is realized, and the rendering efficiency is improved.

For example, the second render platform is Vulkan, the parameter transfer interface in the recorded target primary render command list and the list association interface are the parameter transfer interface and the list association interface, and the command executing interface of the second render platform may be vkCmdExecuteCommands. The parameter transfer interface is configured to execute the empty implementation operation, the list association interface is configured to call vkCmdExecuteCommands at an underlayer of the second render platform, that is, the list association interface in the recorded target primary render command list is configured to call the command executing interface in the second render platform to execute the M sub-render tasks according to the M recorded secondary render command lists in the recorded target primary render command list.

In some embodiments, through the parameter transfer interface in the recorded target primary render command list and the list association interface, it may adapt to a third render platform, the third render platform is a render platform that adopts a render command encoding interface to execute the render tasks, the parameter transfer interface in the recorded target primary render command list is configured to call the render command encoding interface of the third render platform to generate M render command encoders, the M render command encoders are configured to parallelly encode the M recorded secondary render command lists in the recorded target primary render command list to obtain M encoded secondary render command lists, and the third render platform executes the M sub-render tasks according to the M encoded secondary render command lists; one render command encoder corresponds to one recorded secondary render command list; and the list association interface in the recorded target primary render command list is configured to execute the empty implementation operation. Through the parameter transfer interface in the recorded target primary render command list and the list association interface, it adapts to a second render platform, that is, the set of native multi-render interfaces may be used for the second render platform, multi-thread rendering is realized, and the rendering efficiency is improved.

For example, the third render platform is Metal, the parameter transfer interface in the recorded target primary render command list and the list association interface are the parameter transfer interface and the list association interface respectively, the render command encoding interface in the third render platform is MTL parallel render command encoder, and command encoder description information (namely MTL Command Buffer::parallel Render Command Encoder With Descriptor) in a command buffer of the third render platform is called in a begin render pass interface to generate the render command encoding interface (MTL parallel render command encoder). The parameter transfer interface calls the render command encoding interface to generate M render command encoders (MTL render command encoders), the M render command encoders are used for encoding the M recorded secondary render command lists (NGI bundle command lists) respectively to obtain the M encoded secondary render command lists, and the third render platform executes the M sub-render tasks according to the M encoded secondary render command lists. Finally, MTLParallelRenderCommandEncoder:endEncoding is called in an end render pass interface to end this multi-thread calling. The list association interface is configured to execute the empty implementation operation.

In this embodiment of the present disclosure, through the parameter transfer interface in the recorded target primary render command list and the list association interface, a render interface adapts to different render platforms, multi-thread rendering is realized, and the rendering efficiency is improved.

In some embodiments, the acquiring secondary render command lists required for executing the M sub-render tasks respectively may be implemented through the following modes: acquiring M command list pools associated with the render platform, and allocating the secondary render command lists required for executing the M sub-render tasks respectively from the M command list pools, where one command list pool corresponds to one secondary render command list.

The computer device may acquire the M command list pools associated with the render platform, the command list pools include a plurality of render commands for executing the render tasks, and different render commands are used for executing different render tasks; therefore, the computer device may allocate the secondary render command lists required for executing the M sub-render tasks respectively from the M command list pools; and one command list pool corresponds to one secondary render command list.

In some embodiments, the secondary parameter description information corresponding to the M sub-render tasks further includes resource state change information, the resource state change information indicates performing state change on render resources in an execution process of the M sub-render tasks, and the render resources are resources required for executing the sub-render tasks.

The resource state change information corresponding to a first sub-render task is recorded into a target barrier of a first resource state management interface, the first resource state management interface belongs to the recorded target primary render command list corresponding to the target primary render task, and the first sub-render task is a sub-render task with the corresponding render resource being a target render resource in the M sub-render tasks. The target render resource is a resource with an image display parameter, that is, the target render resource is a resource that can be used for displaying, for example, the target render resource includes a depth resource, a texture resource, a stencil resource, a pixel resource and the like, and the target barrier is a function for recording the resource state change information of the target render resource.

The resource state change information corresponding to a second sub-render task is recorded in a first resource barrier of a second resource state management interface; the second resource state management interface belongs to the recorded target primary render command list, and the second sub-render task is a sub-render task with the corresponding render resource being a non-target render resource in the M sub-render tasks; the non-target render resource is a resource without an image display parameter, and the non-target render resource is a resource that cannot be displayed, for example, the non-target render resource includes a mapping resource; and the first resource barrier is a function for recording the resource state change information of the non-target render resource. Through the first resource state management interface and the second resource state management interface, management on different render passes and different resources may be realized, an easy-to-use and efficient resource dependency management interface that may support the sub-render pass and adapt to various render platforms is provided, and it is not necessary to consider the differences among the render platforms, that is, the first resource state management interface and the second resource state management interface are a set of general resource dependency management interfaces. Through orderly management on the render resources, reuse of the render resources may be realized, and the rendering efficiency is improved.

The render pass may refer to a group of rendering processes of an image processor, and the render sub-pass may refer to a rendering process in the group of rendering processes of the image processor, for example, one primary render task may correspond to one render pass, and one sub-render task may correspond to one sub-render pass. The target render resource and the non-target render resource may be obtained by rendering the target image, or may be obtained by rendering adjacent frames of the target image, which is not limited in the present disclosure.

For example, the first resource state management interface and the second resource state management interface may adapt to the following three render platforms:

in some embodiments, the first resource state management interface may adapt to a fourth render platform, and the fourth render platform is a render platform that adopts a global memory to store the target render resource; and the global memory refers to an off-chip memory, the global memory includes part of frame buffer, the frame buffer may also be called a frame buffer, is a direct map of a picture displayed by a screen, and is also called a bit map or raster. Each storage unit of the frame buffer corresponds to a pixel on the screen, and the whole frame buffer corresponds to a frame of image. A tile memory refers to a storage space used by a fifth render platform to optimize a bandwidth, and may also be called an on-chip memory, the on-chip memory is usually a static memory with very a high read and write speed, but due to its relative high price, only a small on-chip memory is usually used. The off-chip memory is usually much larger. A block in the frame buffer is usually stored in the tile memory to avoid accessing it from the global memory every time it is read or written, after all read and write operations, it is determined whether the render resources in the tile memory are written into the global memory, subjected to an MSAA Resolve operation or directly discarded according to configuration of the render pass.

The computer device performs resource state change on the target resource state through a first resource manager, in some embodiments, after entering the render pass associated with the target primary render task, the fourth render platform pauses execution of the target barrier in the first resource state management interface of the recorded target primary render command list, when the fourth render platform executes a sub-render pass associated with a first sub-primary render task, by executing a second resource barrier related to the target render resource, the resource state of the target render resource in the global memory is changed from a current resource state into a target resource state, by performing state change on the resource state of the target render resource, and since the target render resource may be called among the sub-render passes to execute the sub-render tasks, resource dependency management among different sub-render passes may be realized.

The current resource state refers to a resource state of the target render resource before the first sub-render task is executed, the current resource state is recorded into the target barrier, the second resource barrier is inserted during execution of the sub-render pass associated with the first sub-primary render task, and the target resource state is a resource state of the target render resource in the sub-render pass.

The fourth render platform is a D3D12 platform, as shown in FIG. 5, the first resource state management interface may be a begin render pass interface, the target barrier is the target barriers, the computer device pauses (namely ignores) execution of the transferred target barrier in the begin render pass interface, but will record the state (namely the current resource state) of the target render resource before entering the render pass. The first resource barrier inserted into the render pass is executed, but the state of the target render resource before entering the render pass may be directly converted into the target state (namely the required resource state) by skipping a readable and writable state (Target Read Write). At the same time, if the render pass may execute the MSAA Resolve, and under the D3D12 platform, this operation is executed in the end render pass interface.

In some embodiments, the first resource state management interface may adapt to a fifth render platform, the fifth render platform is a render platform that adopts the tile memory to store the target render resource, after the fifth render platform enters the render pass associated with the target primary render task, by executing the target barrier in the first resource state management interface of the recorded target primary render command list, the resource state of the target render resource in the tile memory is changed into the readable and writable state, when the fifth render platform enters the sub-render pass associated with the first sub-primary render task, execution of the second resource barrier related to the target render resource is paused, and the second resource barrier is inserted during execution of the sub-render pass associated with the first sub-primary render task. The resource state of the target render resource in the tile memory is changed into the readable and writable state, so that in a process that the first sub-render task is executed, the target render resource may be read from or written into the tile memory, and in this way, the tile memory may be fully utilized in the render platform with the tile memory. A utilization rate of the tile memory is improved, and the reading and writing efficiency of the target render resource is improved.

For example, the fifth render platform may refer to a Vulkan platform, as shown in FIG. 5, the first resource state management interface may be a begin render pass interface, the target barrier is the target barriers, under the Vulkan platform, the transferred target barrier in the begin render pass interface is executed, the resource state of the target render resource is changed into the readable and writable state, all second resource barriers inserted into the Render Passes (namely the sub-render passes) are ignored, and synchronous information of this part is represented through a sub-render pass dependency relationship when creating the sub-render pass.

In some embodiments, the first resource state management interface may adapt to a sixth render platform, the sixth render platform is a render platform that adopts a tile memory to store the target render resource, after entering the render pass associated with the target primary render task, the sixth render platform calls a resource state management drive, executes the target barrier in first resource state management interface of the recorded target primary render command list, and changes the resource state of the target render resource in the tile memory into the readable and writable state; when entering the sub-render pass associated with the first sub-primary render task, the sixth render platform calls the resource state management drive, and executes the second resource barrier related to the target render resource to change the resource state of the target render resource in the tile memory from the readable and writable state into a target resource state; and the second resource barrier is inserted during execution of the sub-render pass associated with the first sub-primary render task, and the target resource state is a resource state of the target render resource in the sub-render pass. The resource dependency relationship is automatically managed through the resource state management drive, and efficient resource dependency management may be realized.

For example, the sixth render platform is a Metal or OpenGLES3 platform, under the Metal or OpenGLES3 platform, the dependency relationship of all resources is automatically managed by the relational graph management drive, and the above second resource barrier and a target resource barrier both do not need to be specially processed. In some embodiments, after entering the render pass associated with the target primary render task, the sixth render platform calls the resource state management drive, and executes the target barrier in the first resource state management interface of the recorded target primary render command list, and changes the resource state of the target render resource in the tile memory into the readable and writable state; and in this way, the target render resource may be written into or read from the tile memory of the render pass, and the efficient render resource dependency management may be realized. When entering the sub-render pass associated with the first sub-primary render task, the sixth render platform calls the resource state management drive, and executes the second resource barrier related to the target render resource to change the resource state of the target render resource in the tile memory from the readable and writable state into a target resource state; and the second resource barrier is inserted during execution of the sub-render pass associated with the first sub-primary render task, and the target resource state is a resource state of the target render resource in the sub-render pass. The resource dependency relationship is automatically managed through the resource state management drive, and the efficient resource dependency management may be realized.

In some embodiments, before the render platform enters the render pass associated with the target primary render task, by executing the first resource barrier of the second resource state management interface of the recorded target primary render command list, a resource state of the non-target render resource is changed into a designated resource state. Here, the designated resource state may refer to a resource state designated by a user.

S206: Call, in response to that the record mode of the target primary parameter description information is the serial record mode, the target primary record thread, and serially record the target primary parameter description information into the primary render command list corresponding to the target primary render task to obtain a recorded target primary render command list corresponding to the target primary render task.

In this embodiment of the present disclosure, in response to that the record mode of the target primary parameter description information is the serial record mode, the target primary record thread is called, the target primary parameter description information is serially recorded into the primary render command lists corresponding to the target primary render task to obtain the recorded target primary render command list corresponding to the target primary render task; and the primary render command list is recorded through the serial record mode, so that the resource consumption may be reduced.

In some embodiments, the primary parameter description information corresponding to the target primary render task includes primary task attribute information of the target primary render task; and step S206 may be implemented through the following modes: calling, in response to that the record mode of the target primary parameter description information is the serial record mode, the target primary record thread, and recording the primary task attribute information of the target primary render task into the primary render command list corresponding to the target primary render task to obtain the recorded target primary render command list corresponding to the target primary render task.

The primary parameter description information corresponding to the target primary render task includes the primary task attribute information of the target primary render task; in response to that the record mode of the target primary parameter description information is the serial record mode, the computer device may call the target primary record thread, and serially record the primary task attribute information of the target primary render task into the primary render command list corresponding to the target primary render task to obtain the recorded target primary render command list corresponding to the target primary render task; and in this way, there is no need to call too many record threads, and the resource consumption may be reduced.

Figure 7:
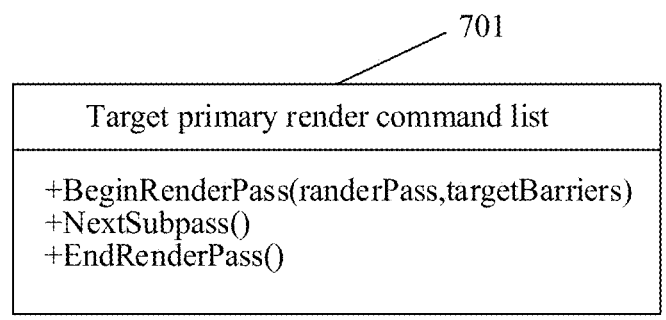
FIG. 7 is a schematic diagram of a target primary render command list provided by the present disclosure.

In some embodiments, when the record mode of the primary parameter description information corresponding to the target primary render task is the serial record mode, the primary parameter description information corresponding to the target primary render task further includes resource state change information of the target render resource required for executing the target primary render task, and the resource state change information corresponding to the target primary render task is recorded into a first resource state management interface of the recorded target primary render command list corresponding to the target primary render task. As shown in FIG. 7, FIG. 7 is a schematic diagram of a target primary render command list provided by the present disclosure, the target primary render command list 701 includes a first resource state management interface, and the first resource state management interface may be a begin render pass interface. After entering the render pass, each render platform may perform state change on the target render resource through the begin render pass interface, which is conducive to improving the resource dependency management. Specially, when the target primary render task needs a non-target render resource, the resource state change information of the non-target render resource may be recorded into a second resource state management interface of the recorded target primary render command list corresponding to the target primary render task; and in this way, the second resource state management interface may change the resource state of the non-target render resource, which is conducive to improving the resource dependency management.

S207: Submit the N recorded primary render command lists to the render platform. The render platform is used for parallelly executing the N primary render tasks according to the N recorded primary render command lists to obtain the target image.

In this embodiment of the present disclosure, the computer device may acquire the N primary render tasks of the to-be-rendered target image, and the primary parameter description information used for describing the execution parameters required for executing the N primary render tasks respectively; and a render object refers to people, articles, plants and so on, and object attribute information includes materials, colors, position information and other information of the render object. In some embodiments, the computer device may determine primary render command lists required for executing the N primary render tasks respectively, and the primary render command lists are associated with the render platform used for executing the N primary render tasks, that is, render commands in the primary render command lists can be executed by the render platform; and the N primary record threads are called, and the N pieces of primary parameter description information are parallelly recorded into the corresponding primary render command lists respectively to obtain the recorded primary render command lists corresponding to the N primary render tasks respectively. In some embodiments, the N recorded primary render command lists are submitted to the render platform, and the render platform indicates parallel execution of the N primary render tasks according to the N recorded primary render command lists to obtain the target image. That is, the primary parameter description information of the primary render tasks is recorded into the primary render command lists related to the render platform to obtain the recorded primary render command lists, that is, the recorded primary render command lists are associated with the render platform, and the recorded primary render command lists can be directly executed by the render platform, that is, there is no need to generate a plurality of layers of primary render command lists, there is no need to perform a translation operation on the primary render command lists, and the internal memory and processor overhead is reduced. At the same time, by calling the N primary record threads to parallelly record the primary render command lists, multi-thread recording may be realized, and the recording efficiency of the primary render command lists is improved.

Figure 8:
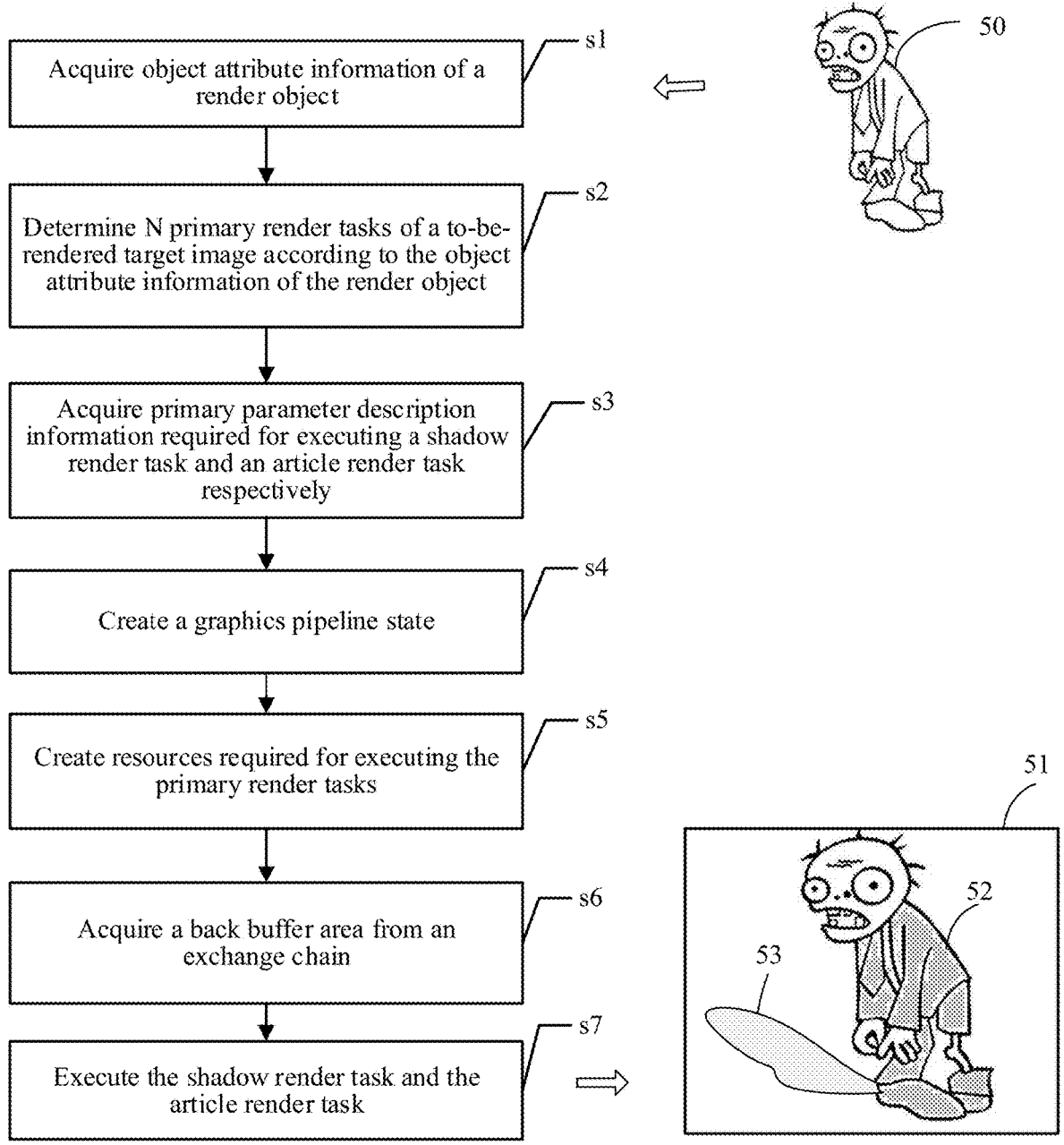
FIG. 8 is a schematic diagram of a scenario of an image rendering method provided by the present disclosure.

As shown in FIG. 8, FIG. 8 is a schematic diagram of a scenario of an image rendering method provided by the present disclosure, a game scenario is taken as an example for explaining the image rendering method in this embodiment of the present disclosure, and the method includes the following processes:

s1: Acquire object attribute information of a render object.

Here, the render object is an article, a building, a virtual person, game equipment and so on in the game scenario, and the object attribute information includes sizes, materials, colors, position information and other information of the render object.

s2: Determine N primary render tasks of a to-be-rendered target image according to the object attribute information of the render object.

For example, the render objects with the similar or same colors are divided into the same primary render task, or the render objects with the same object types are divided into the same primary render task, or areas with shadows are used as a primary render task, namely a shadow render task, and areas without shadows are used as another primary render task, namely an article render task. For example, as shown in FIG. 8, the render object includes a virtual person 50 with a light source at the back. Therefore, the front of the virtual person 50 has a shadow area, a task of rendering the shadow area of the virtual person 50 may be used as the shadow render task, and a task of rendering the virtual person 50 is used as the article render task.

s3: Acquire primary parameter description information required for executing the shadow render task and the article render task respectively.

Step s3 may be implemented through the following modes: acquiring a shader source code related to the shadow render task and acquiring a shader source code related to the article render task, where the shader source code is a source code compiled according to render demands; performing precompile on the shader source code of the shadow render task and the shader source code of the article render task to obtain binary shader files and the primary parameter description information required for executing the shadow render task and the article render task respectively.

Here, the binary shader files refer to code files that can be recognized by the computer device, the primary parameter description information may also be called element information, the primary parameter description information corresponding to the shadow render task includes execution parameters required for executing the shadow render task, and the primary parameter description information corresponding to the article render task includes execution parameters required for executing the article render task. For example, as shown in Table 1, a name of the shader source code of the shadow render task is ShadowCaster.hlsl, a name of the shader source code of the article render task is Shading.hlsl, precompile is performed on Shadow Caster.hlsl to obtain a render resource required for executing the shadow render task, including a push const, and a resource type of the push const is constant buffer; and precompile is performed on Shading.hlsl to obtain a render resource required for executing the article render task, including a shadow sampler and a shadow map texture, and resource types of the shadow sampler and the shadow map texture are a sampler state and a 2D texture resource respectively.

TABLE 1

| Source code | Name | Type |
| --- | --- | --- |
| ShadowCaster.hlsl | PushConst | ConstantBuffer |
| | PushConst | ConstantBuffer |
| Shading.hlsl | shadowSampler | SamplerState |
| | ShadowMap | Texture2D | s4: Create a graphics pipeline state.

During running, first, a pipeline layout is created through element information (namely the primary parameter description information) generated in advance, and the pipeline layout, as a part of description, participates in creating the graphics pipeline state. Other description information includes examples of the render pass, an input layout of vertexes, description of a rasterization stage, description of a fragment shading stage (Blend State), description of a depth testing and stencil testing stage (DepthStencilState), and at this stage, the graphics pipeline state may be created for stages of ShadowCaster and render executing article (shading) respectively. The input layout of the vertexes refers to a process of inputting vertex position information of the render object; and description of other stages refers to FIG. 2, and repetitions are omitted.

s5: Create resources required for creating the primary render task.

During rendering, it is further necessary to create a piece of shadow map texture for receiving pixel information, of which the type is Texture2D. A shadow drawing map is used as a depth target resource (DepthTarget) for use when executing the shadow render task, and used as a shader resource for use when executing the article render task.

s6: Acquire a back buffer from an exchange chain.

The back buffer is a storage space for storing a texture resource, and the texture resource drawn on the back buffer may be presented to a window through a present mechanism; and the exchange chain refers to an assembly that can store a render operation.

s7: Execute the shadow render task and the article render task. The process is totally divided into three stages: a shadow caster stage (a shadow render task executing stage), a render executing article stage and a command list submit and present stage. The shadow caster stage includes preparing a shadow caster primary render command list (shadow caster command list) of the shadow render task, and drawing a shadow map. The render executing article stage: preparing a primary render command list (shading command list) of the article render task, judging whether the fragment is in the shadow through the shadow map texture, and drawing a scenario (namely the pixel information of the article) to the back buffer. In the shadow caster stage and the render article executing stage, two primary render command lists are allocated, and may be parallelly recorded and parallelly executed, which is conducive to realizing native multi-thread rendering. The command list submit and present stage: presenting contents (resources) in the back buffer to a screen, and the contents behind // in Table 2 are used for explaining codes in the next row.

TABLE 2

| // creating a command list required by a shadow caster stage |
| --- |
| shadowCasterCmdList = CommandPool.AllocateCommandList( ) |
| // converting a state of shadowMapTexture from PixelShader ShaderResource into TargetReadWrite |
| shadowCasterCmdList: PipelineBarrier(shadowMapTexture, PixelShaderStageBit \| ShaderResource, TargetReadWrite) |
| // starting a Render Pass |
| shadowCasterCmdList:BeginRenderPass(shadowRenderPass) |
| // creating a plurality of bundle command lists |
| bundles=CommandPool.AllocateBundleCommandList( ) |
| // bonding the bundle command list to the command list |
| shadowCasterCmdList:ForkBundleCommandLists(bundles) |
| // allocating a thread to each bundle command list for recording a render command |
| for_each_parallel: |
|    bundle.Draw() |
| // ending the render command recording of the bundle command list |
| shadowCasterCmdList:JoinBundleCommandLists( ) |
| // end the RenderPass |
| shadowCasterCmdList:Execute(bundles) |
| shadowCasterCmdList:EndRenderPass( ) |

The shadow caster stage, in this stage, as shown by a pseudocode in Table 2, the shadow map texture is used as a non-target render resource for use, therefore, before entering a corresponding render pass, it is necessary to convert a state of the shadow map texture from PixelShaderStageBit|ShaderResource (a pixel shader read-only state) to a readable and writable state (Target Read Write) through a second resource barrier (here it is a pipeline barrier) of a second resource state management interface, and an easy-to-use and efficient resource dependency management interface is implemented. At the same time, in order to improve efficiency, the multi-thread render command recording is performed by allocating a plurality of secondary render command lists, and finally uniform execution is performed through shadowCasterCmdList (a shadow caster command list), which may implement a native multi-thread render interface. Here, the used shadow caster command list and the secondary render command lists are all allocated from a command list pool, and there is no need to manually judge whether they are executed and released on a GPU, which may greatly simplify use of the user.

TABLE 3

```
// allocating a command list used in a shading stage
shadingCmdList = CommandPool.AllocateCommandList( )
// converting shadowMapTexture from TargetReadWrite into PixelShader ShaderResource
shadingCmdList:PipelineBarrier(shadowMapTexture, TargetReadWrite, PixelShaderStageBit |
ShaderResource)
// converting a state of the backbufferTexture from Present into TargetReadWrite
shadingCmdList:PipelineBarrier(backbufferTexture, Present, TargetReadWrite)
// starting a Render Pass
shadingCmdList:BeginRenderPass(shadingRenderPass)
// creating a plurality of bundle command lists
bundles=CommandPool.AllocateBundleCommandList( )
// bonding the bundle command list to the command list
shadingCmdList:ForkBundleCommandLists(bundles)
// allocating a thread to each bundle command list for render command recording
for_each_parallel:
    bundle.Draw( )
// ending the render command recording of the bundle command list
shadingCmdList:JoinBundleCommandLists( )
// end the RenderPass
shadingCmdList:Execute(bundles)
shadingCmdList:EndRenderPass( )
```

In the render article executing stage, as shown by a pseudocode in Table 3, the shadow map texture is used as a shader resource of a pixel shader for use, therefore, before entering the corresponding render pass, it is necessary to convert the shadow caster stage from the readable and writable state into PixelShaderStageBit|ShaderResource (a pixel shader read-only state). Finally, it is outputted to the back buffer on the screen, then it is necessary to convert the present state into the readable and writable state for drawing contents on it, and the resource dependency management of the shadow caster stage and the render article executing stage may implement the easy-to-use and efficient resource dependency management interface. Similarly, in order to improve efficiency, the multi-thread render command recording is performed by allocating a plurality of secondary render command lists, and finally uniform execution is performed through the primary render command list (Shading Cmd List), which may implement the native multi-thread render interface. Here, the used primary render command list and the secondary render command lists are all allocated from the command list pool, and there is no need to manually judge whether they are executed and released on the GPU, which may greatly simplify use of the user.

The command list submit and present stage: as shown by a pseudocode in Table 4, after preparing the Command List (namely a recorded primary command list), it is necessary to perform submitting and presenting through an interface of a command queue, and a frame of target image 51 in the game scenario is obtained by rendering. shadowCasterCmdList (the shadow caster command list) and shadingCmdList (the primary render command list) in Table 4 respectively represent that, as shown in FIG. 8, a shadow area 53 of the target image is obtained by executing shadowCasterCmdList, and an area outside the shadow area 53 in the target image 51 is obtained by executing shadingCmdList.

TABLE 4

```
// submitting prepared command list
   cmdQueue:Submit(shadowCasterCmdList, shadingCmdList)
   // presenting backbufferTexture to a window that needs to be drawn
   cmdQueue:Present(swapchain)
```

Figure 9:
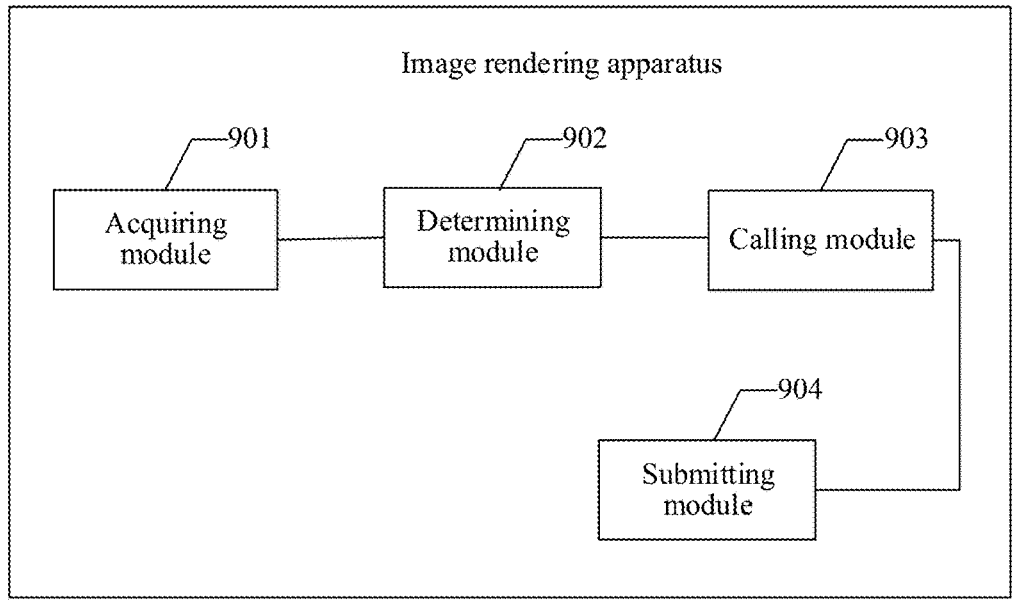
FIG. 9 is a schematic structural diagram of an image rendering apparatus provided by an embodiment of the present disclosure.

Referring to FIG. 9, FIG. 9 is a schematic structural diagram of an image rendering apparatus provided by an embodiment of the present disclosure. The above image rendering apparatus may be a computer program (including a program code) running in a computer device, for example, the image rendering apparatus is application software; and the apparatus may be used for executing corresponding steps in the method provided by the embodiments of the present disclosure. As shown in FIG. 9, the image rendering apparatus may include: an acquiring module 901, a determining module 902, a calling module 903 and a submitting module 904.

The acquiring module is configured to acquire N primary render tasks related to a to-be-rendered target image, and primary parameter description information used for describing execution parameters required for executing the N primary render tasks respectively, N being a positive integer; the determining module is configured to determine primary render command lists required for executing the N primary render tasks respectively, the primary render command lists being associated with a render platform for executing the N primary render tasks; the calling module is configured to call N primary record threads, and parallelly record the N pieces of primary parameter description information into the corresponding primary render command lists to obtain N recorded primary render command lists, one record thread corresponding to one primary render command list; and the submitting module is configured to submit the N recorded primary render command lists to the render platform, the render platform being configured to parallelly execute the N primary render tasks according to the N recorded primary render command lists to obtain the target image.

In some embodiments, the calling N primary record threads, and parallelly recording the N pieces of primary parameter description information into the corresponding primary render command lists to obtain N recorded primary render command lists, includes: acquiring task attribute information of a target primary render task, the target primary render task belonging to the N primary render tasks; determining a record mode of target primary parameter description information corresponding to the target primary render task according to the task attribute information; parallelly recording, in response to that the record mode of the target primary parameter description information is a parallel record mode, the target primary parameter description information into the primary render command list corresponding to the target primary render task according to a target primary record thread, to obtain a recorded target primary render command list corresponding to the target primary render task, where the target primary record thread is a primary record thread for recording the primary render command list corresponding to the target primary render task in the N primary record threads; and calling, in response to that the record mode of the target primary parameter description information is a serial record mode, the target primary record thread and serially recording the target primary parameter description information into the primary render command list corresponding to the target primary render task, to obtain the recorded target primary render command list corresponding to the target primary render task.

In some embodiments, the parallelly recording, in response to that the record mode of the target primary parameter description information is a parallel record mode, the target primary parameter description information into the primary render command list corresponding to the target primary render task according to a target primary record thread, to obtain a recorded target primary render command list corresponding to the target primary render task, includes: acquiring, in response to that the record mode of the target primary parameter description information is the parallel record mode, M sub-render tasks obtained by dividing the target primary render task and secondary render command lists required for executing the M sub-render tasks respectively, the secondary render command lists and the primary render command list corresponding to the target primary render task having an inheritance relationship therebetween; determining secondary parameter description information required for executing the M sub-render tasks from the target primary parameter description information; and parallelly recording the secondary parameter description information corresponding to the M sub-render tasks into the primary render command list corresponding to the target primary render task according to the target primary record thread and the secondary render command lists corresponding to the M sub-render tasks, to obtain the recorded target primary render command list corresponding to the target primary render task.

In some embodiments, the secondary parameter description information corresponding to the M sub-render tasks includes sub-task attribute information corresponding to the M sub-render tasks respectively; the parallelly recording the secondary parameter description information corresponding to the M sub-render tasks into the primary render command list corresponding to the target primary render task according to the target primary record thread and the secondary render command lists corresponding to the M sub-render tasks, to obtain the recorded target primary render command list corresponding to the target primary render task, includes: acquiring M secondary record threads associated with the target primary record thread; calling the M secondary record threads, and parallelly recording the sub-task attribute information corresponding to the M sub-render tasks into the corresponding secondary render command lists respectively, to obtain recorded secondary render command lists corresponding to the M sub-render tasks respectively, where one secondary record thread corresponds to one secondary render command list; and associating the M recorded secondary render command lists with the primary render command list corresponding to the target primary render task to obtain the recorded target primary render command list corresponding to the target primary render task.

In some embodiments, the associating the M recorded secondary render command lists with the primary render command list corresponding to the target primary render task to obtain the recorded target primary render command list corresponding to the target primary render task, includes: acquiring a parameter transfer interface of the primary render command list corresponding to the target primary render task and a list association interface; and transmitting the M recorded secondary render command lists into the parameter transfer interface, and associating the list association interface with the M recorded secondary render command lists to obtain the recorded target primary render command list corresponding to the target primary render task.

In some embodiments, the render platform is a first render platform that adopts an image command list interface to execute a render task, the parameter transfer interface in the recorded target primary render command list is configured to execute an empty implementation operation, the list association interface in the recorded target primary render command list is configured to call the image command list interface in the first render platform to execute the M sub-render tasks according to the M recorded secondary render command lists in the recorded target primary render command list.

In some embodiments, the render platform is a second render platform that adopts a command executing interface to execute a render task, the parameter transfer interface in the recorded target primary render command list is configured to execute an empty implementation operation, and the list association interface in the recorded target primary render command list is configured to call the command executing interface in the second render platform to execute the M sub-render tasks according to the M recorded secondary render command lists in the recorded target primary render command list.

In some embodiments, the render platform is a third render platform that adopts a render command encoding interface to execute a render task, the parameter transfer interface in the recorded target primary render command list is configured to call the render command encoding interface of the third render platform to generate M render command encoders, the M render command encoders are configured to parallelly encode the M recorded secondary render command lists in the recorded target primary render command list to obtain M encoded secondary render command lists, and the third render platform executes the M sub-render tasks according to the M encoded secondary render command lists; one render command encoder corresponds to one recorded secondary render command list; and the list association interface in the recorded target primary render command list is configured to execute the empty implementation operation.

In some embodiments, the determining a record mode of the target primary parameter description information according to the task attribute information, includes: determining a command number of render commands required for executing the target primary render task according to the task attribute information; determining, in response to that the command number is greater than a number threshold value, that the record mode of the target primary parameter description information is the parallel record mode; and determining, in response to that the command number is smaller than or equal to the number threshold value, that the record mode of the target primary parameter description information is a serial record mode.

In some embodiments, the acquiring secondary render command lists required for executing the M sub-render tasks respectively, includes: acquiring M command list pools associated with the render platform; and allocating the secondary render command lists required for executing the M sub-render tasks respectively from the M command list pools, where one command list pool corresponds to one secondary render command list.

In some embodiments, the secondary parameter description information corresponding to the M sub-render tasks further includes resource state change information, and the resource state change information indicates performing state change on render resources in an execution process of the M sub-render tasks; the render resources are resources required for executing the M sub-render tasks respectively; resource state change information corresponding to a first sub-render task is recorded in a target barrier of a first resource state management interface; the first resource state management interface belongs to the recorded target primary render command list corresponding to the target primary render task, and the first sub-render task is a sub-render task with the corresponding render resource being a target render resource in the M sub-render tasks; the target render resource is a resource with an image display parameter; the resource state change information corresponding to a second sub-render task is recorded in a first resource barrier of a second resource state management interface; the second resource state management interface belongs to the recorded target primary render command list, and the second sub-render task is a sub-render task with the corresponding render resource being a non-target render resource in the M sub-render tasks; and the non-target render resource is a resource without an image display parameter.

in some embodiments, the render platform is a fourth render platform that adopts a global memory to store the target render resource; the method further includes: pausing, after the fourth render platform enters a render pass associated with the target primary render task, execution of the target barrier in the first resource state management interface of the recorded target primary render command list; and changing, in response to that the fourth render platform executes a sub-render pass associated with the first sub-primary render task, a resource state of the target render resource in the global memory from a current resource state into a target resource state by executing a second resource barrier associated with the target render resource, where the current resource state refers to a resource state of the target render resource before the first sub-render task is executed, the current resource state is recorded in the target barrier, the second resource barrier is inserted during execution of the sub-render pass associated with the first sub-primary render task, and the target resource state is a resource state of the target render resource in the sub-render pass.

In some embodiments, the render platform is a fifth render platform that adopts a tile memory to store the target render resource; the method further includes: changing, after the fifth render platform enters a render pass associated with the target primary render task, a resource state of the target render resource in the tile memory into a readable and writable state by executing the target barrier in the first resource state management interface of the recorded target primary render command list; and pausing, in response to that the fifth render platform enters a sub-render pass associated with the first sub-primary render task, execution of a second resource barrier associated with the target render resource, where the second resource barrier is inserted during execution of the sub-render pass associated with the first sub-primary render task.

In some embodiments, the render platform is a sixth render platform that adopts a tile memory to store the target render resource; the method further includes: calling, after the sixth render platform enters a render pass associated with the target primary render task, a resource state management drive, executing the target barrier in the first resource state management interface of the recorded target primary render command list, and changing a resource state of the target render resource in the tile memory into a readable and writable state; and calling, after the sixth render platform enters a sub-render pass associated with the first sub-primary render task, a resource state management drive, and changing the resource state of the target render resource in the tile memory from the readable and writable resource state into a target resource state by executing a second resource barrier associated with the target render resource, where the second resource barrier is inserted during execution of the sub-render pass associated with the first sub-primary render task, and the target resource state is a resource state of the target render resource in the sub-render pass.

In some embodiments, before the render platform enters a render pass associated with the target primary render task, a resource state of the non-target render resource is changed into a designated resource state by executing the first resource barrier of the second resource state management interface of the recorded target primary render command list.

According to an embodiment of the present disclosure, steps involved in the image rendering method shown in FIG. 3 may be executed by each module in the image rendering apparatus shown in FIG. 9. For example, step S101 shown in FIG. 3 may be executed by the acquiring module 901 shown in FIG. 9, and step S102 shown in FIG. 3 may be executed by the determining module 902 in FIG. 9; step S103 shown in FIG. 3 may be executed by the calling module 903 shown in FIG. 9; and step S104 shown in FIG. 3 may be executed by the submitting module 904 shown in FIG. 9.

According to an embodiment of the present disclosure, each module in the image rendering apparatus shown in FIG. 9 may be separately or all combined into one or more units. Alternatively, a(some) unit(s) in the image rendering apparatus may be further disassembled into at least two sub-units having smaller functions, and same operations may also be implemented without affecting realizing the technical effects of the embodiments of the present disclosure. The foregoing units are divided based on logical functions. In an actual application, a function of one module may be implemented by at least two units, or functions of the at least two units are implemented by one unit. In other embodiments of the present disclosure, the image rendering apparatus may also include other units. During practical applications, these functions may also be cooperatively implemented by other units and may be cooperatively implemented by at least two units.

According to an embodiment of the present disclosure, a computer program (including program code) that can execute steps involved in the corresponding methods shown in FIG. 5 and FIG. 6 may run on a general computer device of a computer including processing elements and storage elements such as a central processing unit (CPU), a random access memory (RAM), and a read-only memory (ROM), to construct the image rendering apparatus shown in FIG. 9, and implement the image rendering method of the embodiments of the present disclosure. The computer program may be recorded in, for example, a computer-readable recording medium, and may be loaded into the foregoing computing device by using the computer-readable recording medium, and run in the computing device.

In this embodiment of the present disclosure, the computer device may acquire the N primary render tasks of the to-be-rendered target image, and the primary parameter description information used for describing the execution parameters required for executing the N primary render tasks respectively; and a render object refers to people, articles, plants and so on, and object attribute information includes materials, colors, position information and other information of the render object. In some embodiments, the computer device may determine primary render command lists required for executing the N primary render tasks respectively, and the primary render command lists are associated with the render platform used for executing the N primary render tasks, that is, render commands in the primary render command lists can be executed by the render platform; the N primary record threads are called, and the N pieces of primary parameter description information are parallelly recorded into the corresponding primary render command lists respectively to obtain the recorded primary render command lists corresponding to the N primary render tasks respectively. In some embodiments, the N recorded primary render command lists are submitted to the render platform, and the render platform indicates parallel execution of the N primary render tasks according to the N recorded primary render command lists to obtain the target image. That is, the primary parameter description information of the primary render tasks are recorded into the primary render command lists related to the render platform to obtain the recorded primary render command lists, that is, the recorded primary render command lists are associated with the render platform, the recorded primary render command lists can be directly executed by the render platform, that is, there is no need to generate a plurality of layers of primary render command lists, there is no need to perform a translation operation on the primary render command lists, and the internal memory and processor overhead is reduced. At the same time, by calling the N primary record threads to parallelly record the primary render command lists, multi-thread recording may be realized, and the recording efficiency of the primary render command lists is improved.

Figure 10:
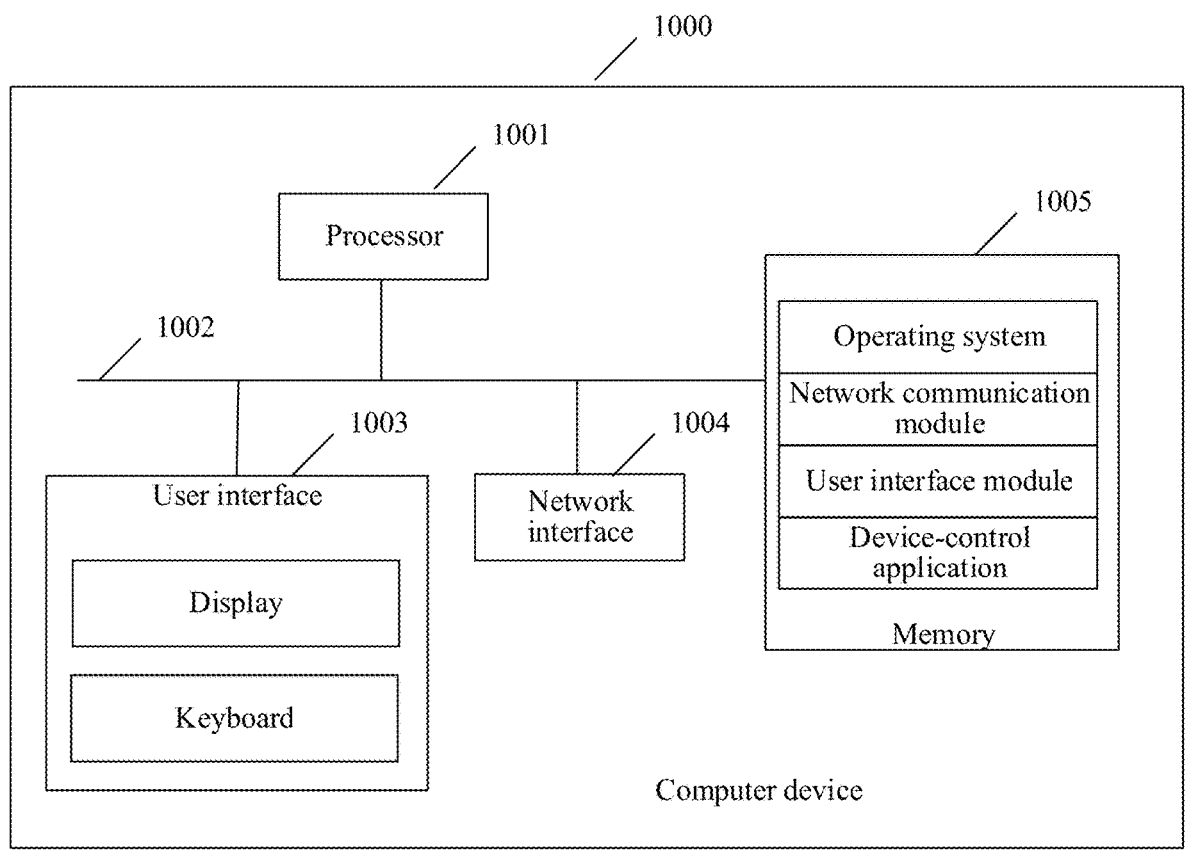
FIG. 10 is a schematic structural diagram of a computer device provided by an embodiment of the present disclosure.

Referring to FIG. 10, FIG. 10 is a schematic structural diagram of a computer device provided by an embodiment of the present disclosure. As shown in FIG. 10, the above computer device 1000 may include: a processor 1001, a network interface 1004, and a memory 1005. In addition, the above computer device 1000 may further include: A user interface 1003 and at least one communication bus 1002. The communication bus 1002 is configured to implement connection and communication among these components. The user interface 1003 may include a display and a keyboard. In some embodiments, the user interface 1003 may further include a standard wired interface and wireless interface. The network interface 1004 may include a standard wired interface and a standard wireless interface (such as a Wi-Fi interface). The memory 1005 may be a high-speed random access memory (RAM), or may be a non-volatile memory, for example, at least one magnetic disk storage. The memory 1005 may further be at least one storage apparatus located away from the above processor 1001. As shown in FIG. 10, the memory 1005 used as a computer-readable storage medium may include an operating system, a network communication module, a user interface module, and a device-control application.

In the computer device 1000 shown in FIG. 10, the network interface 1004 may provide a network communication function; the user interface 1003 is mainly configured to provide an input interface for media contents; and the processor 1001 may be configured to execute the device-control application stored in the memory 1005, to implement: acquiring N primary render tasks related to a to-be-rendered target image, and primary parameter description information used for describing execution parameters required for executing the N primary render tasks respectively, N being a positive integer; determining primary render command lists required for executing the N primary render tasks respectively, the primary render command lists being associated with a render platform for executing the N primary render tasks; calling N primary record threads, and parallelly recording the N pieces of primary parameter description information into the corresponding primary render command lists to obtain N recorded primary render command lists, one record thread corresponding to one primary render command list; and submitting the N recorded primary render command lists to the render platform, the render platform being configured to parallelly execute the N primary render tasks according to the N recorded primary render command lists to obtain the target image.

In some embodiments, the calling N primary record threads, and parallelly recording the N pieces of primary parameter description information into the corresponding primary render command lists to obtain N recorded primary render command lists, includes: acquiring task attribute information belonging to a target primary render task, the target primary render task belonging to the N primary render tasks; determining a record mode of target primary parameter description information corresponding to the target primary render task according to the task attribute information; parallelly recording, in response to that the record mode of the target primary parameter description information is a parallel record mode, the target primary parameter description information into the primary render command list corresponding to the target primary render task according to a target primary record thread, to obtain a recorded target primary render command list corresponding to the target primary render task, where the target primary record thread is a primary record thread for recording the primary render command list corresponding to the target primary render task in the N primary record threads; and calling, in response to that the record mode of the target primary parameter description information is a serial record mode, the target primary record thread and serially recording the target primary parameter description information into the primary render command list corresponding to the target primary render task, to obtain the recorded target primary render command list corresponding to the target primary render task.

In some embodiments, the parallelly recording, in response to that the record mode of the target primary parameter description information is a parallel record mode, the target primary parameter description information into the primary render command list corresponding to the target primary render task according to a target primary record thread, to obtain a recorded target primary render command list corresponding to the target primary render task, includes: acquiring, in response to that the record mode of the target primary parameter description information is the parallel record mode, M sub-render tasks obtained by dividing the target primary render task and secondary render command lists required for executing the M sub-render tasks respectively, where the secondary render command lists and the primary render command list corresponding to the target primary render task have an inheritance relationship therebetween; determining secondary parameter description information required for executing the M sub-render tasks from the target primary parameter description information; and parallelly recording the secondary parameter description information corresponding to the M sub-render tasks into the primary render command list corresponding to the target primary render task according to the target primary record thread and the secondary render command lists corresponding to the M sub-render tasks, to obtain the recorded target primary render command list corresponding to the target primary render task.

In some embodiments, the secondary parameter description information corresponding to the M sub-render tasks includes sub-task attribute information corresponding to the M sub-render tasks respectively; the parallelly recording the secondary parameter description information corresponding to the M sub-render tasks into the primary render command list corresponding to the target primary render task according to the target primary record thread and the secondary render command lists corresponding to the M sub-render tasks, to obtain the recorded target primary render command list corresponding to the target primary render task, includes: acquiring M secondary record threads associated with the target primary record thread; calling the M secondary record threads, and parallelly recording the sub-task attribute information corresponding to the M sub-render tasks into the corresponding secondary render command lists respectively, to obtain recorded secondary render command lists corresponding to the M sub-render tasks respectively, where one secondary record thread corresponds to one secondary render command list; and associating the M recorded secondary render command lists with the primary render command list corresponding to the target primary render task to obtain the recorded target primary render command list corresponding to the target primary render task.

In some embodiments, the associating the M recorded secondary render command lists with the primary render command list corresponding to the target primary render task to obtain the recorded target primary render command list corresponding to the target primary render task, includes: acquiring a parameter transfer interface of the primary render command list corresponding to the target primary render task and a list association interface; and transmitting the M recorded secondary render command lists into the parameter transfer interface, and associating the list association interface with the M recorded secondary render command lists to obtain the recorded target primary render command list corresponding to the target primary render task.

In some embodiments, the render platform is a first render platform that adopts an image command list interface to execute a render task, the parameter transfer interface in the recorded target primary render command list is configured to execute an empty implementation operation, the list association interface in the recorded target primary render command list is configured to call the image command list interface in the first render platform to execute the M sub-render tasks according to the M recorded secondary render command lists in the recorded target primary render command list.

In some embodiments, the render platform is a second render platform that adopts a command executing interface to execute a render task, the parameter transfer interface in the recorded target primary render command list is configured to execute an empty implementation operation, and the list association interface in the recorded target primary render command list is configured to call the command executing interface in the second render platform to execute the M sub-render tasks according to the M recorded secondary render command lists in the recorded target primary render command list.

In some embodiments, the render platform is a third render platform that adopts a render command encoding interface to execute a render task, the parameter transfer interface in the recorded target primary render command list is configured to call the render command encoding interface of the third render platform to generate M render command encoders, the M render command encoders are configured to parallelly encode the M recorded secondary render command lists in the recorded target primary render command list to obtain M encoded secondary render command lists, and the third render platform executes the M sub-render tasks according to the M encoded secondary render command lists; one render command encoder corresponds to one recorded secondary render command list; and the list association interface in the recorded target primary render command list is configured to execute the empty implementation operation.

In some embodiments, the determining a record mode of the target primary parameter description information according to the task attribute information, includes: determining a command number of render commands required for executing the target primary render task according to the task attribute information; determining, in response to that the command number is greater than a number threshold value, that the record mode of the target primary parameter description information is the parallel record mode; and determining, in response to that the command number is smaller than or equal to the number threshold value, that the record mode of the target primary parameter description information is a serial record mode.

In some embodiments, the acquiring secondary render command lists required for executing the M sub-render tasks respectively, includes: acquiring M command list pools associated with the render platform; and allocating the secondary render command lists required for executing the M sub-render tasks respectively from the M command list pools, where one command list pool corresponds to one secondary render command list.

In some embodiments, the secondary parameter description information corresponding to the M sub-render tasks further includes resource state change information, and the resource state change information indicates performing state change on render resources in an execution process of the M sub-render tasks; the render resources are resources required for executing the M sub-render tasks respectively; resource state change information corresponding to a first sub-render task is recorded in a target barrier of a first resource state management interface; the first resource state management interface belongs to the recorded target primary render command list corresponding to the target primary render task, and the first sub-render task is a sub-render task with the corresponding render resource being a target render resource in the M sub-render tasks; the target render resource is a resource with an image display parameter; the resource state change information corresponding to a second sub-render task is recorded in a first resource barrier of a second resource state management interface; the second resource state management interface belongs to the recorded target primary render command list, and the second sub-render task is a sub-render task with the corresponding render resource being a non-target render resource in the M sub-render tasks; and the non-target render resource is a resource without an image display parameter.

in some embodiments, the render platform is a fourth render platform that adopts a global memory to store the target render resource; the method further includes: pausing, after the fourth render platform enters a render pass associated with the target primary render task, execution of the target barrier in the first resource state management interface of the recorded target primary render command list; and changing, in response to that the fourth render platform executes a sub-render pass associated with the first sub-primary render task, a resource state of the target render resource in the global memory from a current resource state into a target resource state by executing a second resource barrier associated with the target render resource, where the current resource state refers to a resource state of the target render resource before the first sub-render task is executed, the current resource state is recorded in the target barrier, the second resource barrier is inserted during execution of the sub-render pass associated with the first sub-primary render task, and the target resource state is a resource state of the target render resource in the sub-render pass.

In some embodiments, the render platform is a fifth render platform that adopts a tile memory to store the target render resource; the method further includes: changing, after the fifth render platform enters a render pass associated with the target primary render task, a resource state of the target render resource in the tile memory into a readable and writable state by executing the target barrier in the first resource state management interface of the recorded target primary render command list; and pausing, in response to that the fifth render platform enters a sub-render pass associated with the first sub-primary render task, execution of a second resource barrier associated with the target render resource, where the second resource barrier is inserted during execution of the sub-render pass associated with the first sub-primary render task.

In some embodiments, the render platform is a sixth render platform that adopts a tile memory to store the target render resource; the method further includes: calling, after the sixth render platform enters a render pass associated with the target primary render task, a resource state management drive, executing the target barrier in the first resource state management interface of the recorded target primary render command list, and changing a resource state of the target render resource in the tile memory into a readable and writable state; and calling, after the sixth render platform enters a sub-render pass associated with the first sub-primary render task, a resource state management drive, and changing the resource state of the target render resource in the tile memory from the readable and writable resource state into a target resource state by executing a second resource barrier associated with the target render resource, where the second resource barrier is inserted during execution of the sub-render pass associated with the first sub-primary render task, and the target resource state is a resource state of the target render resource in the sub-render pass.

In some embodiments, before the render platform enters a render pass associated with the target primary render task, a resource state of the non-target render resource is changed into a designated resource state by executing the first resource barrier of the second resource state management interface of the recorded target primary render command list.

In this embodiment of the present disclosure, the computer device may acquire the N primary render tasks of the to-be-rendered target image, and the primary parameter description information used for describing the execution parameters required for executing the N primary render tasks respectively; and a render object refers to people, articles, plants and so on, and object attribute information includes materials, colors, position information and other information of the render object.

In some embodiments, the computer device may determine primary render command lists required for executing the N primary render tasks respectively, and the primary render command lists are associated with the render platform used for executing the N primary render tasks, that is, render commands in the primary render command lists can be executed by the render platform; the N primary record threads are called, and the N pieces of primary parameter description information are parallelly recorded into the corresponding primary render command lists respectively to obtain the recorded primary render command lists corresponding to the N primary render tasks respectively. In some embodiments, the N recorded primary render command lists are submitted to the render platform, and the render platform indicates parallelly execution of the N primary render tasks according to the N recorded primary render command lists to obtain the target image. That is, the primary parameter description information of the primary render tasks are recorded into the primary render command lists related to the render platform to obtain the recorded primary render command lists, that is, the recorded primary render command lists are associated with the render platform, the recorded primary render command lists can be directly executed by the render platform, that is, there is no need to generate a plurality of layers of primary render command lists, there is no need to perform a translation operation on the primary render command lists, and the internal memory and processor overhead is reduced. At the same time, by calling the N primary record threads to parallelly record the primary render command lists, multi-thread recording may be realized, and the recording efficiency of the primary render command lists is improved.

Figure 4:
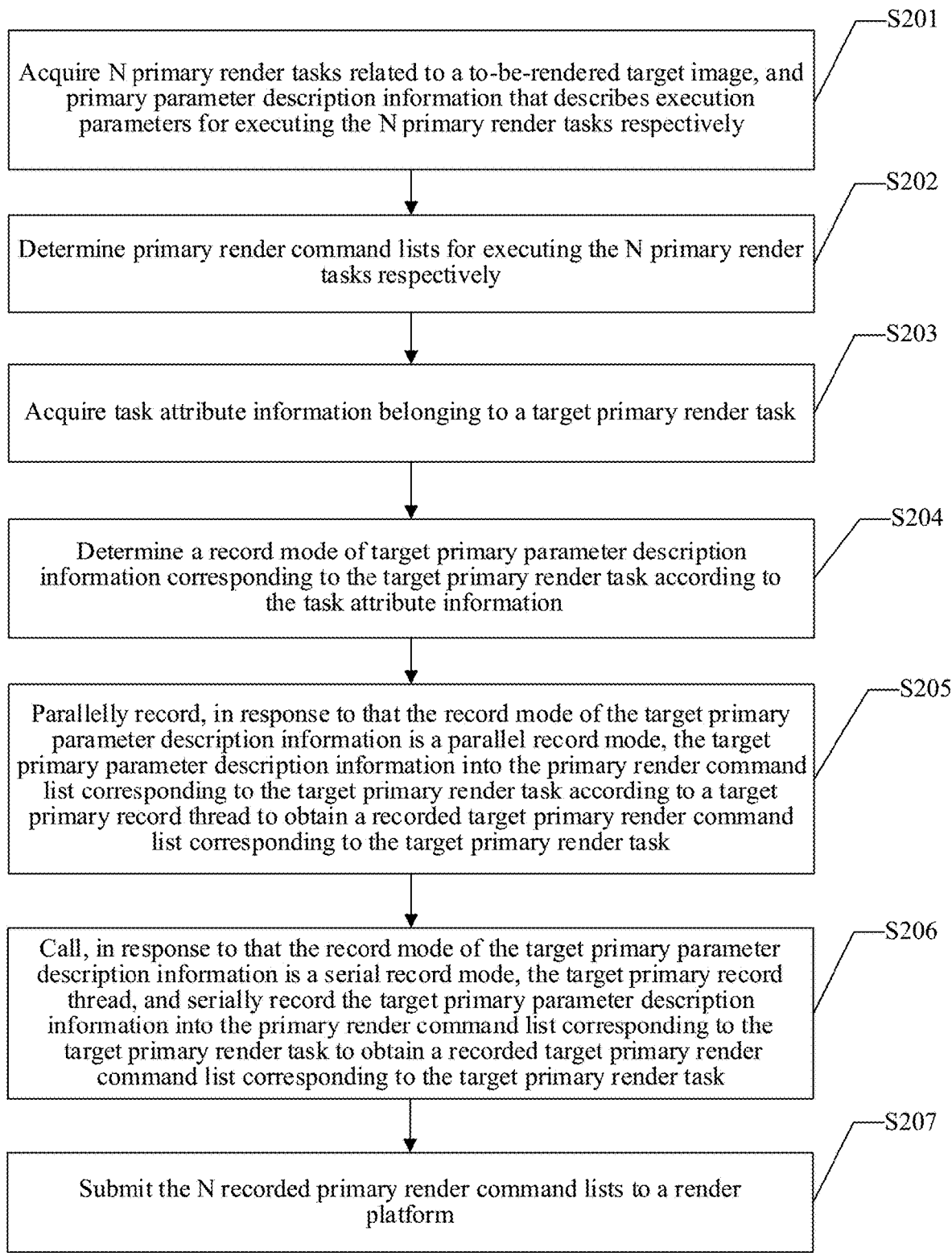
FIG. 4 is a schematic flowchart of a second image rendering method provided by the present disclosure.

It is to be understood that the computer device 1000 described in this embodiment of the present disclosure may execute description of the above image rendering method in the corresponding embodiments of FIG. 3 and FIG. 4, and may also execute description of the above image rendering apparatus in the corresponding embodiment of FIG. 9, which will not be repeated here. In addition, the description of beneficial effects of the same method are not described herein again.

In addition, here it needs to be pointed out that an embodiment of the present disclosure further provides a computer-readable storage medium, the above computer-readable storage medium stores a computer program executed by the above image rendering apparatus, the above computer program includes a program instruction, and the above processor, when executing the above program instruction, can execute description of the above image rendering method in the corresponding embodiments of FIG. 3 and FIG. 4, and therefore, it will not be repeated here. In addition, the description of beneficial effects of the same method are not described herein again. For technical details that are not disclosed in the computer-readable storage medium embodiments of the present disclosure, please refer to the description of the method embodiments of the present disclosure.

As an example, the above program instruction may be deployed to execute on a computer device, or deployed to execute on at least two computer devices in a location, or executed on at least two computer devices distributed in at least two locations and interconnected through a communication network. At least two computer devices distributed in at least two locations and interconnected through the communication network may form a blockchain network.

The above computer-readable storage medium may be an image rendering apparatus provided by any of the above embodiments or a central storage unit of the above computer device, such as a hard disk or central storage of the computer device. The computer-readable storage medium may also be an external storage device of the computer device, such as a plug-in hard disk, a smart media card (SMC), a secure digital (SD) card and a flash card, provided on the computer device. In some embodiments, the computer-readable storage medium may further include both the central storage unit of the computer device and the external storage device. The computer-readable storage medium is configured to store the computer program and other programs and data required by the computer device. The computer-readable storage medium may further be configured to temporarily store data that has been or will be outputted.

Terms such as "first" and "second", in this specification, claims, and the accompanying drawings of the embodiments of the present disclosure are used to distinguish different media contents and are not used to describe a specific sequence. In addition, the term "include", and any variant thereof are intended to cover a non-exclusive inclusion. For example, a process, method, apparatus, product, or device that includes a series of steps or units is not limited to the listed steps or modules; and instead, may further include a step or module that is not listed, or may further include other steps or units that are intrinsic to the process, method, apparatus, product or device.

An embodiment of the present disclosure provides a computer program product, including a computer program/instruction, and the computer program/instruction, when executed by a processor, executing description of the above image rendering method in the corresponding embodiments of FIG. 3 and FIG. 4, and therefore, it will not be repeated here. In addition, the description of beneficial effects of the same method are not described herein again. For technical details that are not disclosed in the computer program product embodiments of the present disclosure, please refer to the description of the method embodiments of the present disclosure.

A person of ordinary skill in the art may understand that, units and algorithm steps of the examples described in the disclosed embodiments may be implemented by electronic hardware, computer software, or a combination thereof. To clearly describe the interchangeability between the hardware and the software, the above description has generally described compositions and steps of each example based on functions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the present disclosure.

The methods and related apparatuses provided in the embodiments of the present disclosure are described with reference to the method flowcharts and/or structural diagrams provided in the embodiments of the present disclosure. Specifically, computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of other programmable image rendering apparatuses to generate a machine, so that the instructions executed by the computer or the processor of the other programmable image rendering apparatuses generate an apparatus for implementing a specific function in one or more processes in the flowcharts and/or in one or more blocks in the block diagrams. These computer program instructions may also be stored in a computer-readable memory that can instruct the computer or any other programmable image rendering apparatuses to work in a specific manner, so that the instructions stored in the computer-readable memory generate an artifact that includes an instruction apparatus. The instruction apparatus implements a specific function in one or more processes in the flowcharts and/or in one or more blocks in the block diagrams. These computer program instructions may also be loaded onto a computer or other programmable image rendering apparatuses, so that a series of operations and steps are executed on the computer or the other programmable devices, thereby generating computer-implemented processing. Therefore, the instructions executed on the computer or the other programmable devices provide steps for implementing a specific function in one or more processes in the flowcharts and/or in one or more blocks in the block diagrams.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. An image rendering method, executed by a computer device, and comprising:
    acquiring N primary render tasks related to a target image to be rendered, and N pieces of primary parameter description information that describes execution parameters for executing the N primary render tasks respectively, N being a positive integer;
    determining primary render command lists for executing the N primary render tasks respectively, the primary render command lists being associated with a render platform for executing the N primary render tasks;
    calling N primary record threads, and parallelly recording the N pieces of primary parameter description information into the corresponding primary render command lists to obtain N recorded primary render command lists, one primary record thread corresponding to one of the primary render command lists, comprising:
        acquiring task attribute information of a target primary render task, the target primary render task belonging to the N primary render tasks;
        determining a record mode of target primary parameter description information corresponding to the target primary render task according to the task attribute information, the record mode being one of a parallel record mode and a serial record mode; and
        recording, according to the record mode, the target primary parameter description information into the primary render command list corresponding to the target primary render task, to obtain a recorded target primary render command list corresponding to the target primary render task; and
    submitting the N recorded primary render command lists to the render platform, the render platform being configured to parallelly execute the N primary render tasks according to the N recorded primary render command lists to obtain the target image.

2. The method according to claim 1, wherein the recording, according to the record mode, the target primary parameter description information into the primary render command list corresponding to the target primary render task, to obtain the recorded target primary render command list corresponding to the target primary render task comprises:

parallelly recording, in response to that the record mode is the parallel record mode, the target primary parameter description information into the primary render command list corresponding to the target primary render task according to a target primary record thread, the target primary record thread being a primary record thread for recording the primary render command list corresponding to the target primary render task in the N primary record threads; and calling, in response to that the record mode is the serial record mode, the target primary record thread and serially recording the target primary parameter description information into the primary render command list corresponding to the target primary render task.

3. The method according to claim 1, wherein the recording, according to the record mode, the target primary parameter description information into the primary render command list corresponding to the target primary render task comprises:

in response to that the record mode of the target primary parameter description information is the parallel record mode, dividing the target primary render task to obtain M sub-render tasks and acquiring secondary render command lists for executing the M sub-render tasks respectively, the secondary render command lists having an inheritance relationship with the primary render command list corresponding to the target primary render task;

determining secondary parameter description information for executing the M sub-render tasks from the target primary parameter description information; and parallelly recording the secondary parameter description information corresponding to the M sub-render tasks into the primary render command list corresponding to the target primary render task according to a target primary record thread and the secondary render command lists corresponding to the M sub-render tasks, to obtain the recorded target primary render command list corresponding to the target primary render task, the target primary record thread being a primary record thread for recording the primary render command list corresponding to the target primary render task in the N primary record threads.

4. The method according to claim 3, wherein the secondary parameter description information corresponding to the M sub-render tasks comprises sub-task attribute information corresponding to the M sub-render tasks respectively; and the parallelly recording the secondary parameter description information corresponding to the M sub-render tasks into the primary render command list corresponding to the target primary render task according to the target primary record thread and the secondary render command lists corresponding to the M sub-render tasks, to obtain the recorded target primary render command list corresponding to the target primary render task, comprises:

acquiring M secondary record threads associated with the target primary record thread;

calling the M secondary record threads, and parallelly recording the sub-task attribute information corresponding to the M sub-render tasks into the corresponding secondary render command lists respectively, to obtain recorded secondary render command lists corresponding to the M sub-render tasks respectively, one secondary record thread corresponding to one of the secondary render command lists; and associating the M recorded secondary render command lists with the primary render command list corresponding to the target primary render task to obtain the recorded target primary render command list corresponding to the target primary render task.

5. The method according to claim 4, wherein the associating the M recorded secondary render command lists with the primary render command list corresponding to the target primary render task to obtain the recorded target primary render command list corresponding to the target primary render task, comprises:

acquiring a parameter transfer interface of the primary render command list corresponding to the target primary render task and a list association interface; and transmitting the M recorded secondary render command lists into the parameter transfer interface, and associating the list association interface with the M recorded secondary render command lists to obtain the recorded target primary render command list corresponding to the target primary render task.

6. The method according to claim 5, wherein the render platform is a first render platform that adopts an image command list interface to execute a render task, the parameter transfer interface in the recorded target primary render command list is configured to execute an empty implementation operation, and the list association interface in the recorded target primary render command list is configured to call the image command list interface in the first render platform to execute the M sub-render tasks according to the M recorded secondary render command lists in the recorded target primary render command list.

7. The method according to claim 5, wherein the render platform is a second render platform that adopts a command executing interface to execute a render task, the parameter transfer interface in the recorded target primary render command list is configured to execute an empty implementation operation, and the list association interface in the recorded target primary render command list is configured to call the command executing interface in the second render platform to execute the M sub-render tasks according to the M recorded secondary render command lists in the recorded target primary render command list.

8. The method according to claim 5, wherein the render platform is a third render platform that adopts a render command encoding interface to execute a render task, the parameter transfer interface in the recorded target primary render command list is configured to call the render command encoding interface of the third render platform to generate M render command encoders, the M render command encoders are configured to parallelly encode the M recorded secondary render command lists in the recorded target primary render command list to obtain M encoded secondary render command lists, and the third render platform executes the M sub-render tasks according to the M encoded secondary render command lists; one render command encoder corresponds to one of the recorded secondary render command lists; and the list association interface in the recorded target primary render command list is configured to execute an empty implementation operation.

9. The method according to claim 5, wherein the secondary parameter description information corresponding to the M sub-render tasks further comprises resource state change information, and the resource state change information indicates performing state change on render resources in an execution process of the M sub-render tasks; the render resources are resources for executing the M sub-render tasks respectively;

resource state change information corresponding to a first sub-render task is recorded in a target barrier of a first resource state management interface; the first resource state management interface belongs to the recorded target primary render command list corresponding to the target primary render task, and the first sub-render task is a sub-render task in the M sub-render tasks that has the corresponding render resource as a target render resource; the target render resource is a resource with an image display parameter;

resource state change information corresponding to a second sub-render task is recorded in a first resource barrier of a second resource state management interface; the second resource state management interface belongs to the recorded target primary render command list, and the second sub-render task is a sub-render task in the M sub-render tasks that has the corresponding render resource as a non-target render resource; and the non-target render resource is a resource without an image display parameter.

10. The method according to claim 9, wherein the render platform is a fourth render platform that adopts a global memory to store the target render resource; and the method further comprises:

pausing, after the fourth render platform enters a render pass associated with the target primary render task, execution of the target barrier in the first resource state management interface of the recorded target primary render command list; and changing, in response to that the fourth render platform executes a sub-render pass associated with the first sub-render task, a resource state of the target render resource in the global memory from a current resource state into a target resource state by executing a second resource barrier associated with the target render resource, wherein the current resource state refers to a resource state of the target render resource before the first sub-render task is executed, the current resource state is recorded in the target barrier, the second resource barrier is inserted during execution of the sub-render pass associated with the first sub-render task, and the target resource state is a resource state of the target render resource in the sub-render pass.

11. The method according to claim 9, wherein the render platform is a fifth render platform that adopts a tile memory to store the target render resource; and the method further comprises:

changing, after the fifth render platform enters a render pass associated with the target primary render task, a resource state of the target render resource in the tile memory into a readable and writable state by executing the target barrier in the first resource state management interface of the recorded target primary render command list; and pausing, in response to that the fifth render platform enters a sub-render pass associated with the first sub-render task, execution of a second resource barrier associated with the target render resource, wherein the second resource barrier is inserted during execution of the sub-render pass associated with the first sub-render task.

12. The method according to claim 9, wherein the render platform is a sixth render platform that adopts a tile memory to store the target render resource; and the method further comprises:

calling, after the sixth render platform enters a render pass associated with the target primary render task, a resource state management drive, executing the target barrier in the first resource state management interface of the recorded target primary render command list, and changing a resource state of the target render resource in the tile memory into a readable and writable state; and calling, after the sixth render platform enters a sub-render pass associated with the first sub-render task, a resource state management drive, and changing the resource state of the target render resource in the tile memory from the readable and writable resource state into a target resource state by executing a second resource barrier associated with the target render resource, wherein the second resource barrier is inserted during execution of the sub-render pass associated with the first sub-render task, and the target resource state is a resource state of the target render resource in the sub-render pass.

13. The method according to claim 9, further comprising:

changing, before the render platform enters a render pass associated with the target primary render task, a resource state of the non-target render resource into a designated resource state by executing the first resource barrier of the second resource state management interface of the recorded target primary render command list.

14. The method according to claim 3, wherein the acquiring secondary render command lists for executing the M sub-render tasks respectively, comprises:

acquiring M command list pools associated with the render platform; and allocating the secondary render command lists for executing the M sub-render tasks respectively from the M command list pools, one command list pool corresponding to one of the secondary render command lists.

15. The method according to claim 1, wherein the determining a record mode of the target primary parameter description information according to the task attribute information, comprises:

determining a command number of render commands for executing the target primary render task according to the task attribute information;

determining, in response to that the command number is greater than a number threshold value, that the record mode of the target primary parameter description information is the parallel record mode; and determining, in response to that the command number is smaller than or equal to the number threshold value, that the record mode of the target primary parameter description information is the serial record mode.

16. The method according to claim 1, wherein:

a platform that records the primary render command lists is different from a render platform that executes the recorded primary render command lists.

17. The method according to claim 1, wherein:

the primary render command lists are associated with at least two different render platform; and the primary render command lists comprise uniform native render interfaces that adapt to the at least two render platforms.

18. An image rendering apparatus, comprising:
at least one processor and at least one memory,
the at least one memory being configured to store a computer program, and the at least one processor being configured to execute the computer program and perform:
acquiring N primary render tasks related to a target image to be rendered, and N pieces of primary parameter description information that describes execution parameters for executing the N primary render tasks respectively, N being a positive integer;
determining primary render command lists for executing the N primary render tasks respectively, the primary render command lists being associated with a render platform for executing the N primary render tasks;
calling N primary record threads, and parallelly recording the N pieces of primary parameter description information into the corresponding primary render command lists to obtain N recorded primary render command lists, one primary record thread corresponding to one of the primary render command lists, comprising:
acquiring task attribute information of a target primary render task, the target primary render task belonging to the N primary render tasks;
determining a record mode of target primary parameter description information corresponding to the target primary render task according to the task attribute information, the record mode being one of a parallel record mode and a serial record mode; and
recording, according to the record mode, the target primary parameter description information into the primary render command list corresponding to the target primary render task, to obtain a recorded target primary render command list corresponding to the target primary render task; and
submitting the N recorded primary render command lists to the render platform, the render platform being configured to parallelly execute the N primary render tasks according to the N recorded primary render command lists to obtain the target image.

19. The apparatus according to claim 18, wherein the recording, according to the record mode, the target primary parameter description information into the primary render command list corresponding to the target primary render task, to obtain the recorded target primary render command list corresponding to the target primary render task comprises:
parallelly recording, in response to that the record mode of the target primary parameter description information is the parallel record mode, the target primary parameter description information into the primary render command list corresponding to the target primary render task according to a target primary record thread, the target primary record thread being a primary record thread for recording the primary render command list corresponding to the target primary render task in the N primary record threads; and
calling, in response to that the record mode of the target primary parameter description information is the serial record mode, the target primary record thread and serially recording the target primary parameter description information into the primary render command list corresponding to the target primary render task.

20. A non-transitory computer-readable storage medium, storing a computer program, and the computer program, when being loaded and executed by at least one processor, causing a computer device having the at least one processor to execute:
acquiring N primary render tasks related to a target image to be rendered, and N pieces of primary parameter description information that describes execution parameters for executing the N primary render tasks respectively, N being a positive integer;
determining primary render command lists for executing the N primary render tasks respectively, the primary render command lists being associated with a render platform for executing the N primary render tasks;
calling N primary record threads, and parallelly recording the N pieces of primary parameter description information into the corresponding primary render command lists to obtain N recorded primary render command lists, one primary record thread corresponding to one of the primary render command lists, comprising:
acquiring task attribute information of a target primary render task, the target primary render task belonging to the N primary render tasks;
determining a record mode of target primary parameter description information corresponding to the target primary render task according to the task attribute information, the record mode being one of a parallel record mode and a serial record mode; and
recording, according to the record mode, the target primary parameter description information into the primary render command list corresponding to the target primary render task, to obtain a recorded target primary render command list corresponding to the target primary render task; and
submitting the N recorded primary render command lists to the render platform, the render platform being configured to parallelly execute the N primary render tasks according to the N recorded primary render command lists to obtain the target image.

* * * * *